United States Patent [19]

Lentz et al.

[11] Patent Number: 5,499,384

[45] Date of Patent: Mar. 12, 1996

[54] INPUT OUTPUT CONTROL UNIT HAVING DEDICATED PATHS FOR CONTROLLING THE INPUT AND OUTPUT OF DATA BETWEEN HOST PROCESSOR AND EXTERNAL DEVICE

[75] Inventors: Derek J. Lentz, Los Gatos; Kian-Chin Yap, San Jose, both of Calif.

[73] Assignee: Seiko Epson Corporation, Tokyo, Japan

[21] Appl. No.: 997,943

[22] Filed: Dec. 31, 1992

[51] Int. Cl.$^6$ .................................................. G06F 15/02
[52] U.S. Cl. .................... 395/821; 395/299; 395/726; 364/240.2; 364/240.3; 364/242.6; 364/DIG. 1
[58] Field of Search ........................ 395/275, 325, 395/250, 425, 725; 364/240.2, 240.3

[56] References Cited

U.S. PATENT DOCUMENTS

| | | | |
|---|---|---|---|
| 3,654,617 | 4/1972 | Irwin | 340/172.5 |
| 4,321,665 | 3/1982 | Shen et al. | 364/200 |
| 4,371,932 | 2/1983 | Dinwiddie, Jr. et al. | 364/200 |
| 4,516,199 | 5/1985 | Frieder et al. | 364/200 |
| 4,750,113 | 6/1988 | Buggert | 364/200 |
| 4,785,453 | 11/1988 | Chandran et al. | 371/68 |
| 4,851,990 | 7/1989 | Johnson et al. | 364/200 |
| 4,860,244 | 8/1989 | Bruckert et al. | 364/900 |
| 4,878,166 | 10/1989 | Johnson et al. | 364/200 |
| 4,982,321 | 1/1991 | Pantry et al. | 364/200 |
| 4,987,530 | 1/1991 | Wagner et al. | 364/200 |
| 5,003,465 | 3/1991 | Chisholm et al. | 364/200 |
| 5,014,194 | 5/1991 | Itoh | 364/200 |
| 5,088,025 | 2/1992 | Fujimoto | 395/275 |
| 5,101,478 | 3/1992 | Fu et al. | 395/275 |
| 5,136,692 | 8/1992 | Barrett et al. | 395/250 |
| 5,142,672 | 8/1992 | Johnson et al. | 395/500 |
| 5,155,810 | 10/1992 | McNamara, Jr. et al. | 395/250 |
| 5,212,776 | 5/1993 | Zandveld et al. | 395/325 |
| 5,224,214 | 6/1993 | Rosich | 395/250 |
| 5,239,644 | 8/1993 | Seki et al. | 395/425 |
| 5,255,371 | 10/1993 | Latimer et al. | 395/250 |
| 5,276,850 | 1/1994 | Sakane | 395/425 |
| 5,293,495 | 3/1994 | Nguyen et al. | 395/325 |
| 5,333,276 | 7/1994 | Solari | 395/325 |
| 5,333,294 | 7/1994 | Schnell | 395/425 |

FOREIGN PATENT DOCUMENTS

| | | |
|---|---|---|
| 0113683 | 7/1984 | European Pat. Off. . |
| 0423036 | 4/1991 | European Pat. Off. . |
| 0486230 | 5/1992 | European Pat. Off. . |
| 4121974 | 11/1992 | Germany . |
| WO86/04169 | 7/1986 | WIPO . |

*Primary Examiner*—Thomas C. Lee
*Assistant Examiner*—Moustafa M. Meky
*Attorney, Agent, or Firm*—Sterne, Kessler, Goldstein & Fox

[57] ABSTRACT

An I/O controller (IOU) is provided for transferring data between a host processor and one or more I/O devices. The I/O controller includes means for enabling concurrent performance of two different modes of data transfer between the host processor and the I/O controller. The main memory in the present invention will have its own memory bus while all other I/O devices and memory devices will sit on an external I/O bus. The IOU will interface with a Memory Controller Unit (MCU) to coordinate the data transfer directed to or from the external I/O bus. The I/O Controller also serves as a queuing structure to maximize the memory bandwidth of the memory bus and increase the data flow throughput. The I/O controller serves to provide proper handshaking signals to control the timing and direction of data and address flow.

42 Claims, 11 Drawing Sheets

INPUT OUTPUT CONTROL UNIT HAVING DEDICATED PATHS FOR CONTROLLING THE INPUT AND OUTPUT OF DATA BETWEEN HOST PROCESSOR AND EXTERNAL DEVICE

BACKGROUND OF THE INVENTION

1. Field of the Invention

The present invention relates generally to data processing computer systems and, more particularly, to the transfer of data between a host processor and at least one I/O device.

2. Description of the Prior Art

A typical computer-based processor system (or computer system) consists of three major subsystems: a main memory, one or more host processors (the term CPU, host processor, and processor will be used interchangeably in this disclosure), and an input-output (I/O) subsystem. In order to provide communication between the host processor and a plurality of external input/output (I/O) devices, such as disks, tapes, printers, display devices, it is effective for data processing systems to utilize an intermediate control unit, also known as an I/O controller.

The I/O controller facilitates interchange of data between a computer system and remote peripheral devices. As a result, I/O controllers relieve the main host processor of many of its operating cycle obligations for ensuring that data exchanges between various remote peripheral devices and the main host processor system is accomplished with minimal interruption to the main host processor.

In most conventional systems utilizing such an approach, the host processor supplies an appropriate command to the I/O controller. The I/O controller then interprets the commands so that the selected I/O device can be identified and the appropriate data processing and transfer operations can occur. The host normally supplies such commands in sequence and the I/O processor processes such commands in such sequence. If the I/O processor is busy with a particular command requiring the servicing of a specified I/O device, then the host must wait until that process is complete before it can issue subsequent commands related to either the same or a different I/O device.

Conventional microprocessor systems usually consist of a single transmission medium, known as a bus, having an array of common conductors onto which many circuit elements are coupled. In a typical system, all the I/O devices and the memory devices must share the same processor bus 150 as shown in FIG. 1. Clearly, only one device in the system can transmit data onto the common bus at any given time, further slowing the transfer of data between peripheral devices and the host processor.

A more detailed description of some of the basic concepts discussed in this section is found in a number of references, including John L. Hennessy et al., *Computer Architecture—A Quantitative Approach* (Morgan Kaufmann Publishers, Inc., San Mateo, Calif., 1990); and the i486™ *Microprocessor Programmer's Reference Manual* and the i486™ *Microprocessor Hardware Reference Manual* (Order Nos. 240486 and 240552, respectively, Intel Corporation, Santa Clara, Calif., 1990). These documents are incorporated by reference herein in their entirety.

SUMMARY OF THE INVENTION

The present invention provides an input output control unit (IOU) which connects a host processor to an external input/output (I/O) bus. It also connects external master devices on the input/output bus to a memory system tightly tied to the host processor and internal peripheral devices. The memory system is connected to its own memory bus while all other peripheral I/O devices and memory devices are coupled to the separate external I/O bus. IOU interfaces with a Memory Control Unit (MCU) to coordinate the data transfer directed to or from the external I/O bus. The IOU also serves as a queuing structure to maximize the memory bandwidth of the memory bus and increase data flow throughput. External master and host data and transaction requests are buffered in the system. The buffering has been optimized to allow for maximum system flexibility with minimum circuit cost. Moreover, the IOU serves to provide proper handshaking signals to control the timing and direction of data and address flow. The system is designed primarily for use on the same VLSI circuit as the host processor.

The system also provides for the incorporation of an internal interrupt controller as well as connecting to and supporting the use of an external interrupt controller. The system is able to operate with multiple width devices on the I/O bus.

In particular, the IOU is designed to provide an interface between the MCU and an external I/O bus (which may be compatible with existing CPU's) to support data transfer mechanisms such as instruction cache read, data cache read/write, memory read/write, and DMA transfers. To accomplish these tasks, the IOU provides a first dedicated data path for the transfer of read dam (the "read path") from address memory segments to the interface means for transfer to the MCU, a second dedicated data path (the "write path") for transfer of write data received from the MCU through the interface means to addressed memory segments, and a third dedicated path for transfer of memory addresses (the "address path") from the MCU for identification of addressed memory segments.

BRIEF DESCRIPTION OF THE DRAWINGS

The foregoing and other features and advantages of the invention will be apparent from the following more particular description of the invention, as illustrated in the accompanying drawings.

DETAILED DESCRIPTION OF THE PRESENT INVENTION

I. Overview

The present invention is a system which connects a host processor to an external input/output (I/O) bus. It also connects external master devices on the input/output bus to a memory system tightly tied to the host processor and internal peripheral devices. The system is designed primarily for use on the same VLSI circuit as the host processor.

The system provides for the connection of peripherals to the I/O bus and host processor. It also provides for the incorporation of an internal interrupt controller as well as connecting to and supporting the use of an external interrupt controller.

External master and host dam and transaction requests are buffered in the system. The buffering has been optimized to allow for maximum system flexibility with minimum circuit cost. The system is able to operate with multiple width devices on the I/O bus. Various other useful features are also provided and are described herein.

The I/O controller is designed to provide an interface between a Memory Control Unit (MCU) and the external I/O bus to support data transfer mechanism such as I cache read, D cache read/write, memory read/write and DMA transfers. The I/O controller serves to provide proper handshaking signals to control the timing and direction of data and address flow. The queuing structures within the I/O controller enable the maximization of MCU memory bandwidth and increase data flow throughput.

II. Environment of the Present Invention

Figure 2:
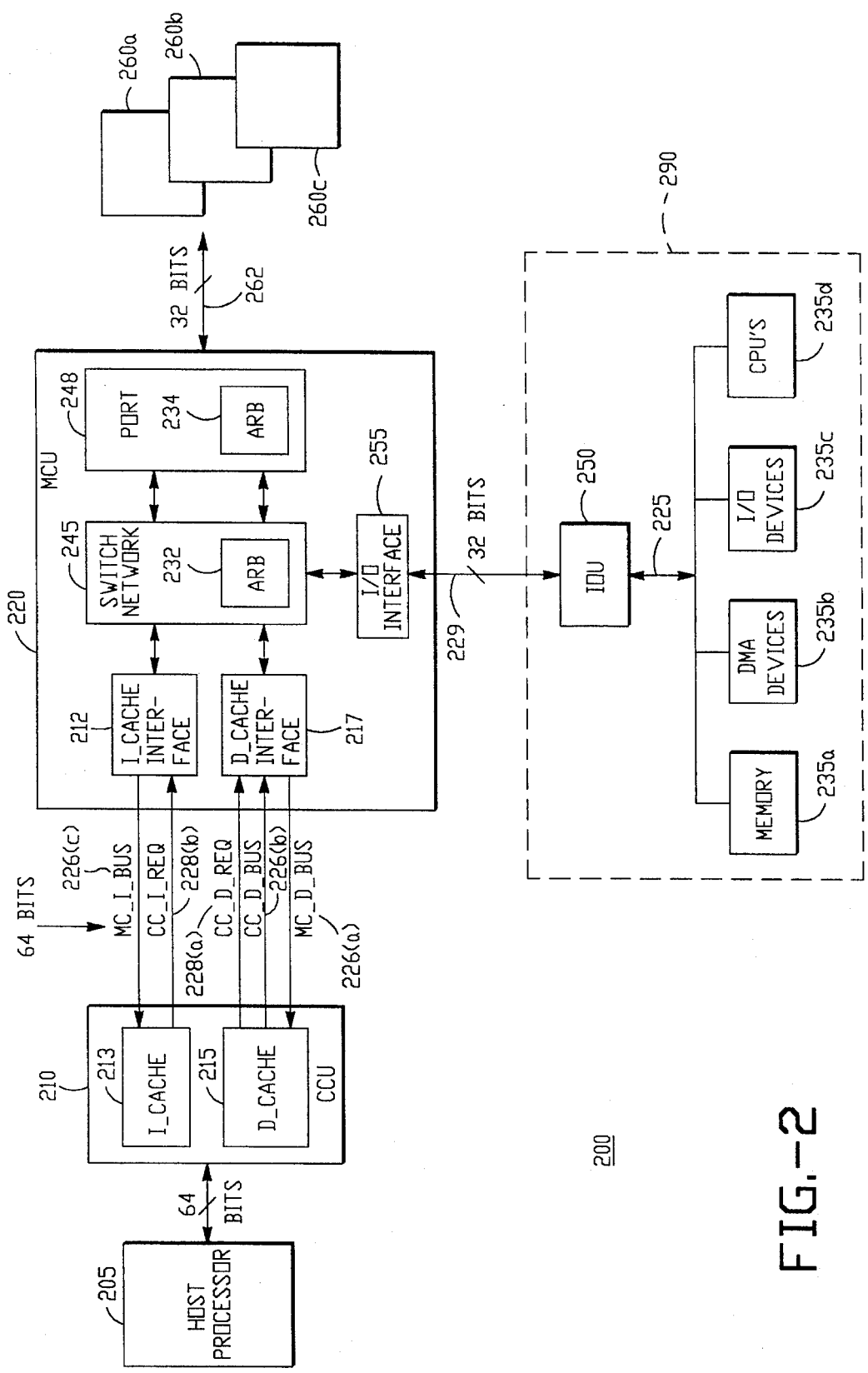
FIG. 2 is a high level diagram of the microprocessor system in which the present invention operates.

Referring to FIG. 2, there is provided in accordance with a preferred embodiment of the present invention a microprocessor architecture designated generally as 200. System architecture 200 includes a host processor 205, a cache memory 210, an I/O subsystem 290, a memory control and interface unit (MCU) 220, and interleaved memory banks 260a, 260b, 260c (hereinafter main memory 260) configured for interleaved operations. Main memory 260 is connected to MCU 220 via an external bus 262. It is contemplated that the present invention will operate in a multiprocessor environment, and as such, other processors will be connected to memory bus 262.

Host processor 205 executes software instructions which are typically stored at addresses, or locations, in main memory 260. These software instructions are transferred to host processor 205 sequentially under the control of a program counter. Oftentimes, some of the instructions require that host processor 205 access one or more of the peripheral I/O devices 235.

Cache memory 210 is used to serve as a buffer between host processor 205 and main memory 260. Generally, cache 210 is a small, fast memory located close to host processor 205 that holds the most recently accessed code or dam. Typically, host processor 205 is the fastest unit in the system, with a processor cycle typically of tens of nanoseconds, while memory 260 has a cycle time of hundreds of nanoseconds. The speed gap between host processor 205 and main memory 260 can be closed by using fast cache memory 210 between the two.

MCU 220 of a preferred embodiment of the present invention comprises a switch network 245 which includes a switch arbitration unit 232, a data cache interface circuit 217, an instruction cache interface circuit 212, an I/O interface circuit 255, and one or more memory port interface circuits 248 known as ports, each port interface circuit 248 includes a port arbitration unit 234. MCU 220 is a circuit whereby data and instructions are transferred (read or written) between CCU 210 (both D-cache 215 and I-cache 213 (read only)), IOU 250 and main memory 260.

Switch network 245 is a means of communicating between a master and slave device. The possible master devices to switch network 220 are D_Cache 215, I_Cache 213, or an I/O Controller Unit (IOU) 250 and the possible slave devices are memory port 248 or IOU 250, for example.

The function of switch network 245 is to receive the various instruction and data requests from cache controller unit (CCU) 210 (i.e., I_Cache 213 and D_Cache 215) and IOU 250. These units may be referred to as bus requestors. After having received these requests, the switch arbitration unit 232 and the port arbitration unit 234 prioritizes the request(s) and passes them to the appropriate memory port (depending on the instruction address). The port 248, or ports as the case may be, will then generate the necessary timing signals, send or receive the necessary data to and from external memory bus 262. Memory interface port 248 manages the data by sending to and receiving from interleaved memory 260.

Figure 1:
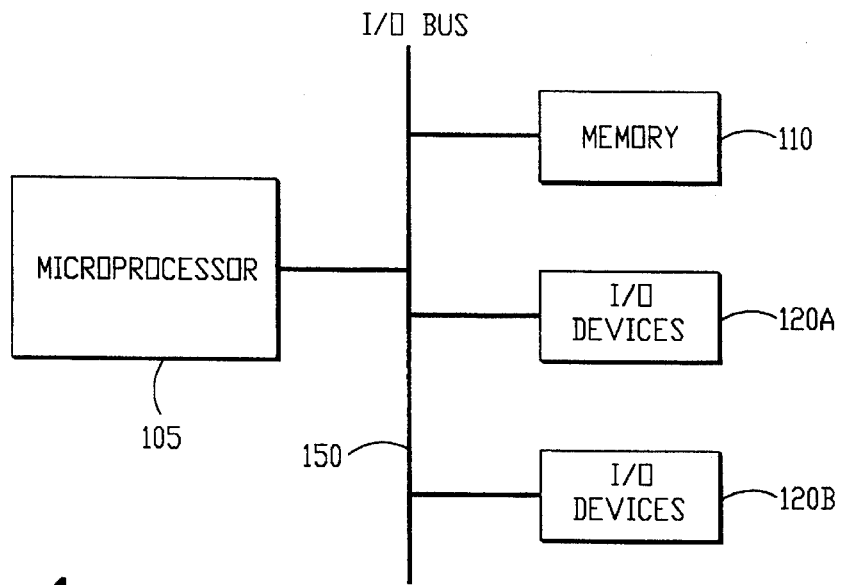
FIG. 1 is a high level diagram of a conventional microprocessor system.

IOU 250 interfaces with an external I/O bus 225, and in turn with I/O devices 235. Main memory 260 in the present invention has its own memory bus, while all other I/O devices and memory devices are coupled to an external I/O bus 225. This is in contrast to system architecture 100 shown in FIG. 1, where I/O devices 120 share an I/O bus with memory device 110. Architecture 200 has the advantage of allowing data transfers or memory access to both main memory 260 and I/O devices 235 concurrently. In addition, by making the main memory 260 separate from the external I/O bus 225, the memory bandwidth will be maximized. In other words, the host processor 205 can fetch instructions and data from main memory 260 without being affected by slow I/O transfers.

External I/O Bus 225 is designed to provide a PC compatible functional interface to external I/O devices. It is a synchronous, 32 bit wide, and bidirectional bus interface. The bus employs separate parallel busses for data and addresses. The address bus consists of 30 upper order bit address lines pointing to the 4-byte word location and 4 individual byte enable signals to select an active byte within the 4-byte word.

The bus is synchronous to a bus clock (BClk), which is an output clock generated from the system clock. BClk is intended to be the master clock for all bus decoding and control logic. BClk can be pin programmed to be equal to the system clock or equal to one half the system clock during power-up reset. If a phase lock loop is added an external BClk can be used.

Bus requests by the processor which are more than the bus width (i.e., greater than 16 bits) or which access devices which are narrower than the data size of the operation will generate multiple bus cycles. An example of the first case is when the processor executes a quad word store to the I/O space, which translates to either eight 16-bit cycles or sixteen 8-bit cycles, depending on the maximum bus size. Additional cycles are required for unaligned data transfers. In a preferred embodiment, external I/O bus 225 is implemented to support little-endian byte order.

External I/O bus 225 has a burst mode mechanism to enable high speed data transfers. During burst cycles, a new data item can be strobed out every BClk. Given the first address in a burst, the address of subsequent transfers can be calculated in advance by an incremental counter. External I/O bus 225 supports non-cacheable bus transfers such as single cycle or multiple cycle, burst or non-burst, 8-bit, 16-bit, or 32-bit, pseudo-locked (no bus grant during atomic transfers) and locked cycles. The minimum bus cycle is two clock cycles long.

External I/O bus 225 of the present invention allows external bus masters (DMA devices or other processors), but performs arbitration between the internal IOU 250 and external master (e.g., host processor 205) internally. External interrupts are also handled by the bus interface. During the second interrupt acknowledge signal of the locked cycles, a vectored interrupt will be passed to the internal interrupt controller (shown in FIG. 3 as 362).

III. I/O Controller 250 Structure and Operation

As stated above, IOU 250 is designed to provide an interface between MCU switch 245 and an external I/O bus 225 and to support data transfer mechanisms such as instruction cache read, data cache read/write, memory read/write, and DMA transfers. IOU 250 provides and responds to handshaking signals which control the timing and direction of data and address flow. As will be appreciated, the queuing structures within the IOU 250 enable the maximization of MCU memory bandwidth and increased data flow throughput.

Figure 3:
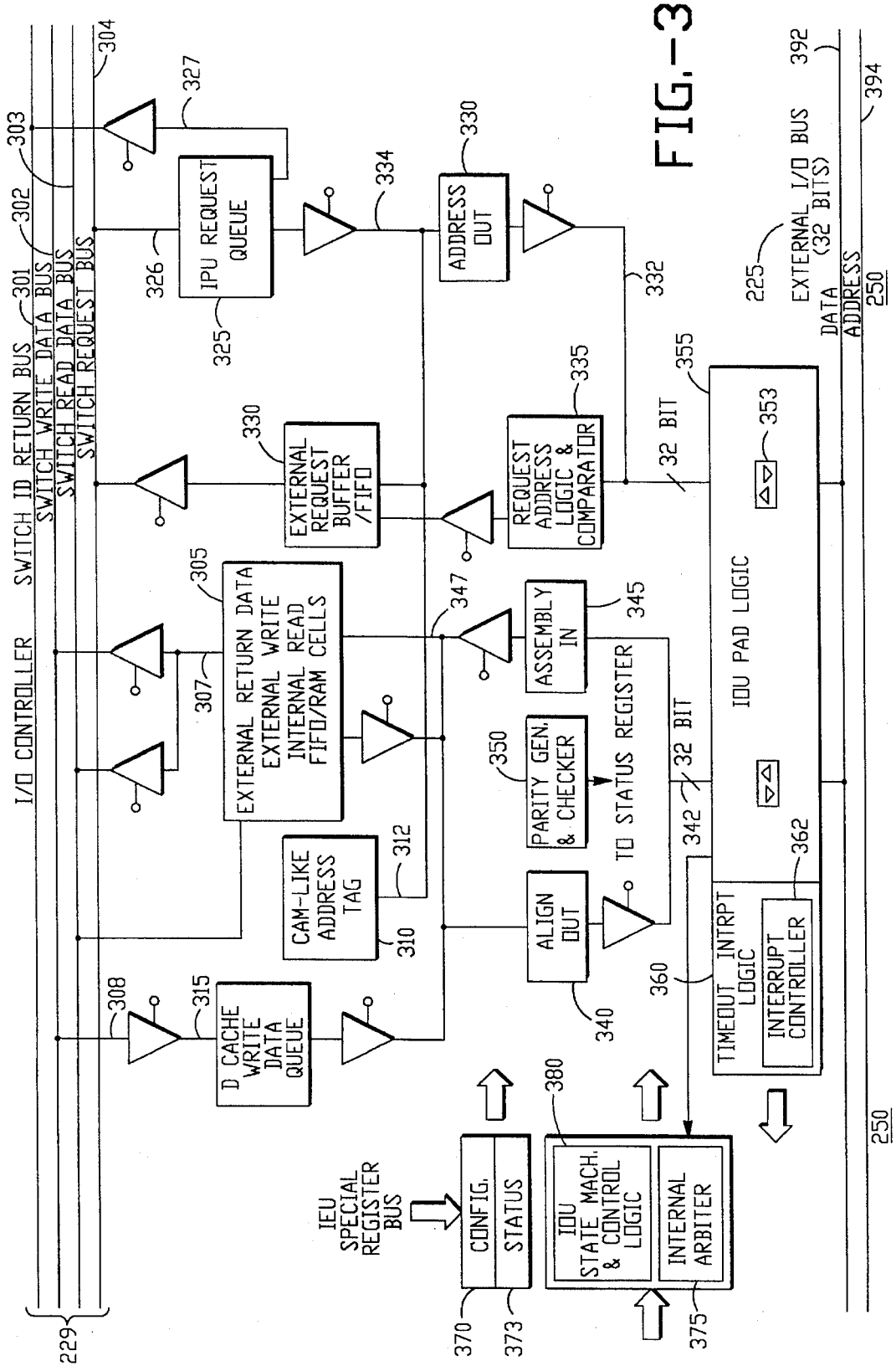
FIG. 3 is a derailed block diagram of the I/O controller 250 of the preferred embodiment of the present invention.

FIG. 3 is a functional block diagram illustrating the datapath of IOU 250. IOU 250 includes two types of data transfers. The functions and description of IOU 250 will be presented descriptively in two sections. Section (A) will describe the operation of IOU 250 when IPU 205 is a master and I/O device 235 is a slave and section (B) will describe the operation of IOU 250 when I/O device 235 is the master and IOU 250 is the slave. Note that although IPU 205 is typically not a slave, it could be operated in a slave capacity for testing purposes.

A. When Host Processor 205 is a Master and an I/O Device 235 is a Slave

When IPU 205 is a master and an I/O device 235 is a slave, the master will want to either write data to the slave or read data or instructions from the slave. The functional operation of IOU 250 in both these scenarios is described below.

1. Writing Data to a Slave Device

The following discussion refers to FIG. 2 and FIG. 3. Described below is the procedure followed when host processor 205 is the master and it is trying to write data to an I/O device(s) 235 (i.e., a slave device), along with a detailed description of IOU 250.

Generally, the actions taken by host processor 205 in order to write data to slave device 235 originates from the decoded instruction fetched from I_Cache 213. For example, if host processor 205 decodes an instruction for storing data in a memory location located in a slave device, then host processor 205 will submit the data and the I/O destination address to CCU 210. CCU 210 will then pass the information to MCU 220, which in turn passes the information to IOU 250. IOU 250 sends out the data and address, as described below, onto the external I/O bus 225 without decoding the information further. Each individual slave device 235 will decode the address and determine if the data was intended for them. All I/O devices are typically mapped to a certain address range, and thus, only one I/O device can be selected at any given time.

In particular, once an instruction has been decoded, the data and associated address are transferred to MCU 220. MCU 220 then arbitrates for access to switch bus 229. Once access is granted, MCU transfers the information to IOU 250. An internal arbiter 375 located in IOU 250 then arbitrates for access to external I/O bus 225. Generally, access to external I/O bus 225 can be requested by an external interrupt controller (not shown), an internal peripheral, an external bus master, or by host processor 205 itself.

As stated above, the information transferred to IOU 250 includes the data to be written and the associated address. The data is placed on switch write data bus 302 by MCU 220. From switch write data bus 302, the data is placed in a D_Cache write data queue 315 (hereinafter write data queue 315) via a tri-state buffered line 308. Tri-state buffers are used where appropriate throughout IOU 250 to minimize wires. Thus, at any one time, data can only flow in one direction, and as such, only one transaction can take place at any given time over the tri-state buffered lines.

In a preferred embodiment of the present invention write data queue 315 is an eight entry, 64 bit wide FIFO. Data queued up in write data queue 315 by MCU 220 will be transferred to the appropriate I/O device(s) 235 by IOU 250 once external I/O bus 225 becomes available. At any given time, write data queue 315 is capable of storing up to eight long words of data. The storing of data in write data queue 315 before IOU 250 obtains access to external I/O bus 225 helps increase memory bandwidth since IOU 250 can continue to accept data from MCU 220 while it waits for access to external I/O bus 225.

Simultaneously with the data entering write data queue 315, write request information from the switch request bus 304 is placed in Internal Processing Unit (IPU) request queue 325 via bus line 326. In a preferred embodiment, at any given time IPU request queue 325 can hold two entries. The possible write request information that can be stored includes the addresses for storing data, the word size of the data to be stored, and functional attributes of the requests coming from I_cache 213 or D_cache 215. IPU request queue 325 also stores information regarding whether the request is a write or a read.

Figure 4:
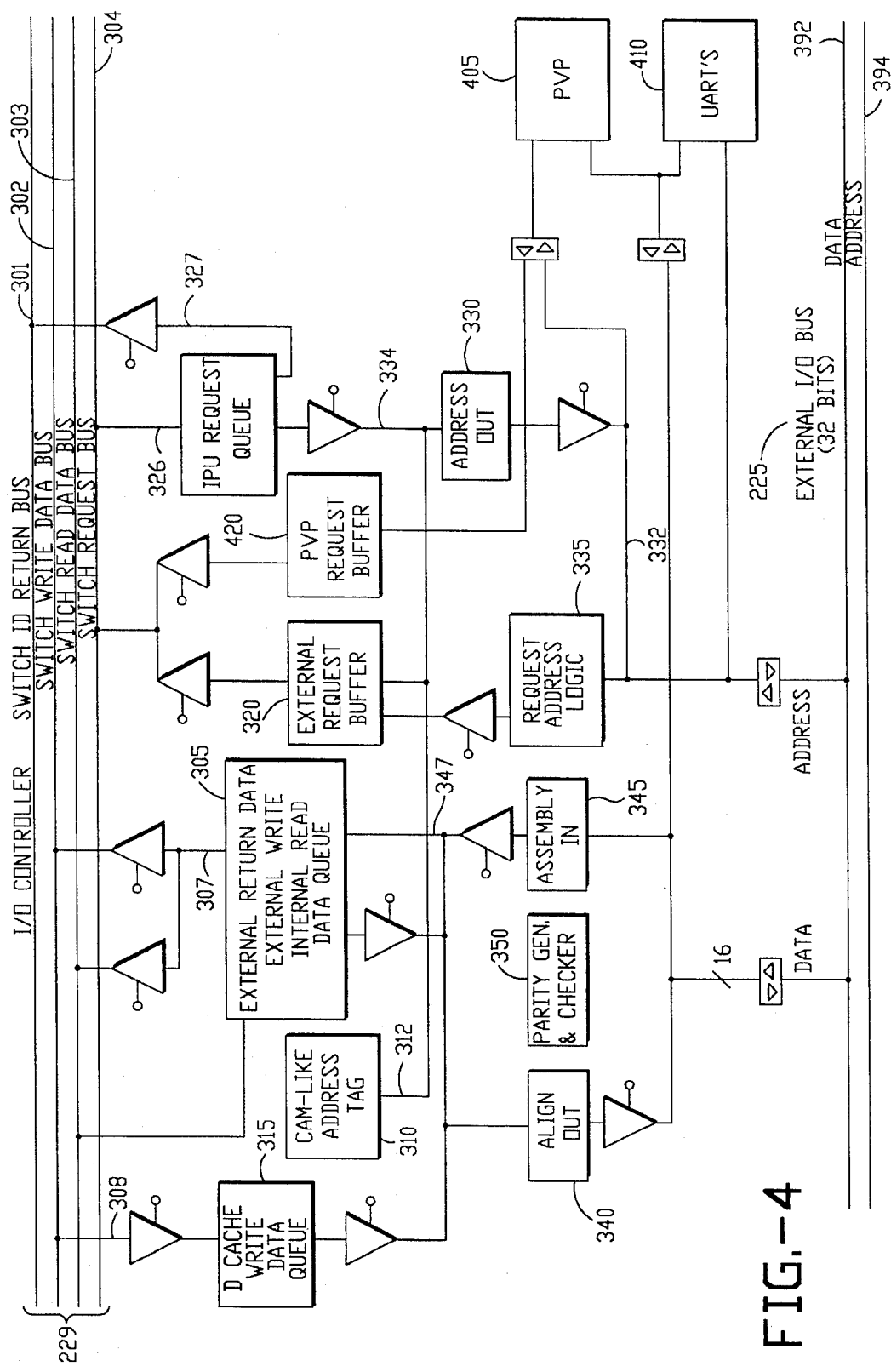
FIG. 4 is a derailed block diagram of the I/O controller 250 with an on-chip PVP and UART's.

FIG. 4 shows IOU 250 along with an on-chip printer video processor (PVP 405) and universal asynchronous receiver/transmitters (UART's) 410. An additional PVP request buffer 420 is also provided (as described below). The operation of IOU 250 is essentially the same with or without the on-chip devices.

Requests stored in IPU request queue 325 which are directed to on-chip devices or external I/O devices will need extra cycles to arbitrate for external I/O bus 225 and to perform address decoding before an IPU request queue 325 acknowledgment signal (which tells MCU 220 that IOU 250 has accepted the request and that IOU 250 will dispatch the request) can be sent back to switch network 245. Even though PVPs and UARTs are resident on the chip (see FIG. 4), they are treated as external I/O devices and access to them will still require arbitration for external I/O bus 225. This is done to save wiring and control circuitry; while performance loss is minimal.

The dam and request information will remain in write data queue 315 and IPU request queue 325, respectively, while internal arbiter 375 arbitrates for external I/O bus 225. Once external I/O bus 225 becomes available and access to it is granted by internal arbiter 375, the data transfer can begin.

IOU state machine and control logic block 380 (hereinafter IOU control logic 380) generates the appropriate control timing for the transfer of the data to the I/O bus 225. Furthermore, IOU control logic 380 defines external access protocol (i.e., the generation of proper pin timing function and sequence signals to meet the bus timing requirements) for external I/O bus 225 master/slave implementation. Still further, it provides for multiprocessor slave operation of IOU 250. In other words, control logic block 380 will allow the support of having other CPUs as slaves during data transfer, along with the coordination of an external arbiter (not shown) if necessary. Design and operation of IOU control logic is implementation specific and any discussion of it is beyond the scope of this application. Those skilled in the art will readily appreciate how to generate the necessary control logic to operate IOU 250.

The first step in transferring data onto external I/O bus 225 is to align the data. In a system having a plurality of peripheral devices coupled over a common bus, an orderly system must be provided for transferring data between main memory 260 and the peripheral devices 235. In such systems, the width of the unit of information interchanged between the peripheral device and IOU 250 may be different than the width of the unit of information which is normally read from or written to main memory 260. For example, in some cases a byte of information may be interchanged between the peripheral device and IOU 250 and a word of information consisting of a multiple bytes of data may be read from or written to main memory 260. In these cases, mechanisms must be provided to ensure that the width of data being sent from main memory 260 to slave devices via IOU 250 is acceptable. The data must also be properly aligned for transfer to data lines of the common bus (i.e., external I/O bus 225).

Write data queue 315 stores data in 64 bits blocks. However, external I/O bus 225 is generally not 64 bits wide. Typically, external I/O devices are either 32 bits, 16 bits, or 8 bits in width. The chip containing IOU 250 has a pair of pins (not shown) for determining what width device is currently connected to IOU 250. The pins allow an external system to specify, on a cycle-by-cycle basis, whether an addressed peripheral can supply or receive 8, 16, or 32 bits of data on external I/O bus 225. Dynamic bus sizing is supported by external I/O bus 225 to allow connections of 8, 16, and/or 32 bit peripherals. Dynamic bus sizing is typically determined every clock cycle.

Generally, operand alignment logic (blocks 340 and 345) is used to realign outgoing data to external I/O bus 225 and assemble and align incoming data from external I/O bus 225 by decoding the lower bits of the address and the byte enables associated with the data. Outgoing data from switch network 245 which comes in improper alignment boundaries will be aligned by selecting the active enabled bytes according to the decoded lower bits of the associated address. The aligned data will be transferred in multiple bus cycles depending on the data size and whether an 8, 16, or 32 bit device is being addressed.

I/O operand alignment is designed in accordance with the operand alignment rules of external I/O bus 225. As stated above, multiple cycles will be generated depending on the size of external I/O bus 225 (and/or size of the peripheral device), the operand lengths, and the alignment of a particular transfer. Generally, for 1–4 byte operand transfers, the operand can be any location within the long word boundary. For 5–7 byte operand transfers, the operand must be left justified or right justified in the long word boundary. 16 byte transfers must be aligned to a long word boundary and 32 byte transfers must be aligned to a 32 byte boundary.

The transfer rules for transferring data between IOU 250 and peripherals 235 are outlined below. If data is completely within an aligned 32 bit word, the data is passed out of IOU 250 in one cycle. If data crosses over a boundary between byte 3 and byte 4 within a long word, the valid data in the high word (bytes 4–7) is passed out first and then the valid data in low word (bytes 0–3) is passed out of IOU 250. Thus, if any part of both high word data (bytes 4–7) and low word (bytes 0–3) are valid, two external transfer cycles are required.

IOU 250 receives starting address and "size" of operation (1–8 bytes). If size equals one byte, then operation is trivial. If the size of the data transfer is eight bytes, high word of long word is passed out during first cycle, then low word of long word is passed out during second cycle.

A preferred embodiment has the following restriction: Byte enables used in the operand alignment should never have patterns with de-asserted byte enable bits separating asserted byte enables. (This only applies when there are 4 byte enables.) In other words, asserted byte enables should be contiguous.

Parity generator/checker 350 is used to generate or check even parity of the outputted or inputted data, respectively. Although parity checking is used in a preferred embodiment, it is only optional. Furthermore, odd parity could also be used. Even parity implies that there are an even number of high inputs on the eight data pins (not shown) and the parity pin (not shown). Parity generator/checker 350 is connected to both assembly logic 345 and align logic 340. When data enters IOU 250 the data and its accompanying parity bit are checked to determine whether the data is correct (i.e., at even parity). Furthermore, when data is transferred out of IOU 250 the parity bit is set so that even parity is generated. Data parity is generated with the same timing as write data in the write data cycles. During read cycles, even parity must accompany read data to avoid parity error. If there is a parity error, an error signal is given to status register 373. Status register 373 is periodically read by an instruction fetch unit (IFU) (not shown) which is housed inside host processor 205. Once there is an interrupt, the interrupt controller 362 signals the IFU. This, in turn, causes IFU to read the status register 373. Once IFU realizes that there has been, for example, a parity error it recognizes this as an I/O memory error exception and branches to an interrupt handler routine.

Figure 5:
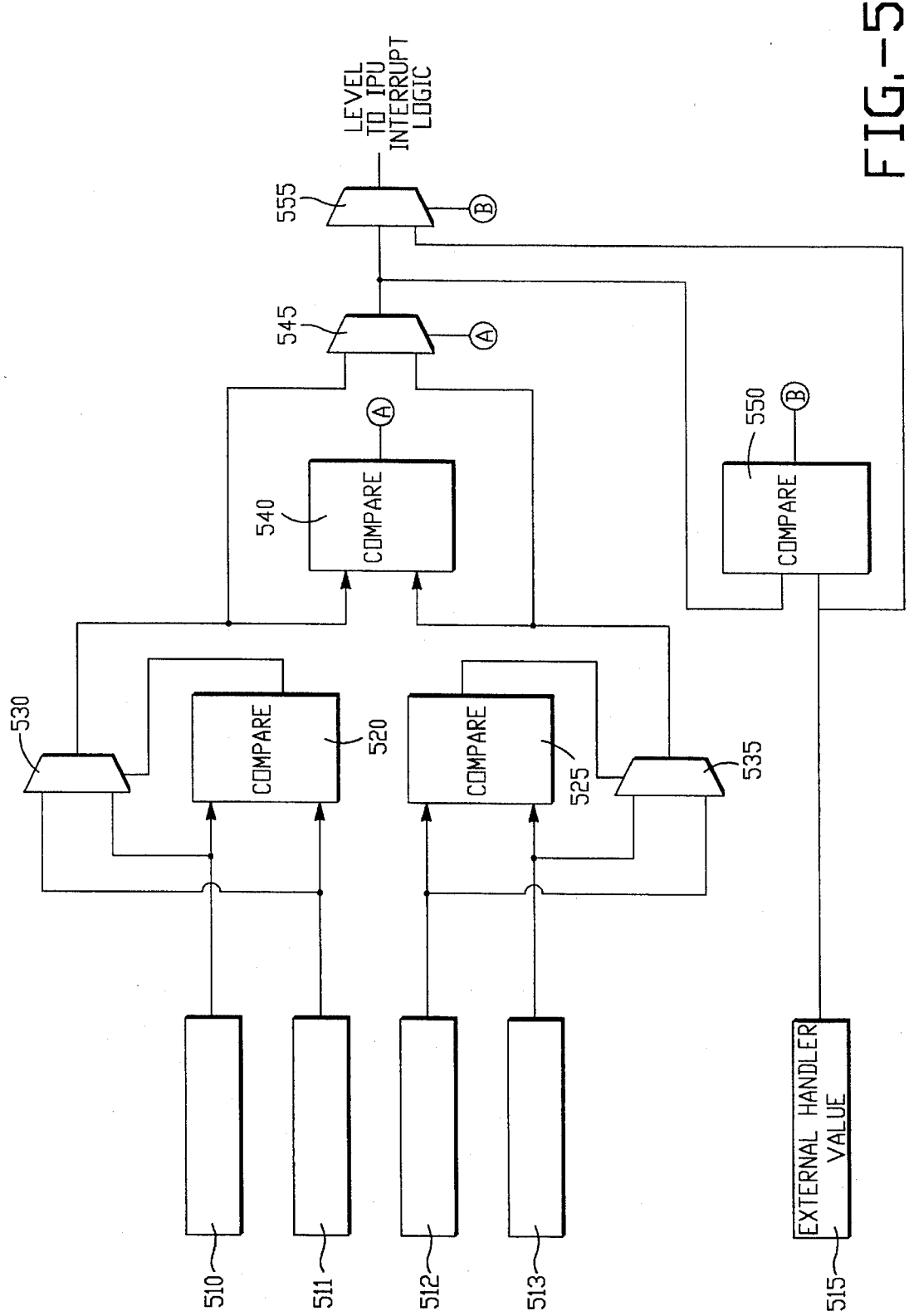
FIG. 5 shows a diagram of interrupt controller 362.

FIG. 5 shows a schematic diagram of internal interrupt controller 362. A preferred embodiment uses four internal I/O priority values 510–513 and an external value 515. Priority values 510–513 are used as inputs into a pair of magnitude comparators 520, 525 and a pair of multiplexors 530, 535. The outputs from magnitude comparators 520, 525 are used to control multiplexors 530, 535. The highest priority value is selected and output from multiplexors 530, 535. Next, these two priority values are compared in magnitude comparator 540. The output from magnitude comparator 540 is used to control multiplexor 545. Thus, the output of multiplexor 545 is the highest priority value selected from the four internal I/O priority values.

A preferred embodiment also makes a comparison with an external handler value 515. External handler value 515 is compared in magnitude comparator 550 with the highest internal I/O priority value (which was selected by multiplexor 545). The output from magnitude comparator 550 is used to control multiplexor 555 which outputs the highest interrupt level (value) to processor 205.

Referring again to FIG. 3, simultaneously with the alignment of the outgoing data, the request information that has previously been stored in IPU request queue 325 is transferred via a tri-state buffered line 334 to the Address Sequence Generator (Address Out) 330. Address Out 330 generates a continuous sequence of addresses using request attributes from IPU request queue 325 for read or write access to either on chip or off chip I/O slave devices, which in turn allows burst or non-burst mode access.

The aligned data and the request information will be transferred via tristate buffered lines 342 and 332, respectively, to an IOU pad logic and sampling and synchronization buffer 355 (hereinafter pad 355). Pad 355 contains control logic for signals to be driven out to external I/O bus 225. The embedded logic in the pad 355 allows ample set-up time for signals to be driven out of pad 355 to the external I/O bus 225. Moreover, any incoming signals from the external I/O bus 225 will be sampled and synchronized to the bus clock by pad 355 before being processed.

Once the data is transferred to external I/O bus 225 the write operation is complete (as far as IOU 250 is concerned). I/O devices 235 (or an external decoder (not shown)) decode the request information and determine therefrom where the data is to be written. As stated briefly above, IOU 250 has a status register 373 and an I/O configuration register 370. These registers are used to define functionality and control IOU 250's functional blocks. The default values below are the values after reset. All bits which are not specified are reserved and should be programmed to 0, if written to, and are not defined if read. Bits which are "set by pins" are set by values sampled from pins at system power-up reset.

I/O Status Register 373 in a preferred embodiment contains the following bits:

TABLE A

| Bits | Default: | Function: |
| --- | --- | --- |
| <0> | unspecified | Host Processor I/O Parity Interrupt Active (optional) |
| <1> | unspecified | DMA I/O Parity Interrupt Active (optional) |
| <5:4> | set by pins | Boot Options |
| <8> | set by pins | External Arbiter Selected |
| <9> | set by pins | BClk Frequency |

Bit 0 is set if a host processor 205 operation has a parity error. Bit 1 is set if a DMA operation has a parity error. The External Arbiter Selected bit is set if an external arbiter (not shown) has been selected. If bus clock (BClk) is ½ of the internal clock, the BClk Frequency bit is set. Otherwise it is clear.

I/O Configuration Register (CFG) 370 contains the following bits:

TABLE B

| Bits: | Default: | Function: |
| --- | --- | --- |
| <0> | unspecified | IPU I/O Parity Interrupt Enable |
| <1> | unspecified | DMA I/O Parity Interrupt Enable |
| <7:4> | 0 | DINT <3:0> Interrupt Enables |
| <8> | 0 | INTR Interrupt Enable |
| <12> | 0 | External DMA Burst Mode Enable |

The DINT and INTR interrupt enables individually enable the associated interrupt pins. The Burst Mode Enable pin enables support of burst mode operation by external DMA devices if set. If clear, burst mode operations by external DMA devices are not supported.

2. Reading Data from a Slave Device

The second type of data transfer occurs when host processor 205 performs a read from one of the I/O devices 235. Once again, IOU 250 must first arbitrate for external I/O bus 225. However, while IOU 250 waits for external I/O bus 225 to become available, the address representing the location of the data to be read can be stored in IPU 205 request queue 325 along with the size of the data block to be read. Eventually, and as described in detail below, IOU 250 will obtain access to external I/O bus 225 and the slave device will return the requested data.

Once IOU 250 is granted access to external I/O bus 225, it passes the address stored in IPU request queue 325 to the Address Out block 330 and through pad logic 355 to address bus 394. Subsequently, the specified I/O device 235 returns the requested data. The requested data, which enters IOU 250 via dam bus 392, is optionally checked for a parity error by parity generator and checker 350. If there is a parity error then a status bit is set in status register 373 and an interrupt is generated.

The requested dam is returned in blocks of either 8, 16, or 32 bits, as described above. However, system 200 is adapted to handle 64 bit blocks. Thus, the present invention provides a means for re-aligning the dam into 64 bit blocks. This function is handled by assembly in block 345. Block 345 has a set of latches which buffer up to 8 bytes (one long word) of dam. The data is transferred to assembly-in block 345 via line 342 and subsequently aligned into 64 bit blocks. Moreover, assembly in block 345 checks, with the aid of a request address logic and comparator block 335 (hereinafter comparator block 335), for a contiguous address in order to determine if the entire requested data block has been returned. Comparator block 335 checks to determine whether the returned data has an associated address which falls into the address range of the requested data block by keeping the first address during each access and comparing it with subsequent incoming addresses.

Write data to memory must be aligned to their physical address alignment. In other words, in memory a word (4 bytes) needs to be written to word boundary (i.e., the lowest two bits of the write address must be 00) and a half word (2 bytes) needs to be written to half word boundary (i.e., the lowest one bit of the write address must be 0).

Once an out of range address field is detected and assembly in block 345 has aligned the requested data, block 345 will transfer the data to queue 305 (described below) via a tri-state buffered line 347. Typically the data is transferred in 64 bit blocks. However, sometimes the requested sequence of dam is not a multiple of 64, and less than 64 bits of data must be transferred to queue 305. Consequently, control information is returned to MCU switch network 245 which indicates the size of the data block being transferred.

The external return dam, external write and internal read FIFO/RAM cells (R/W FIFO) 305 serves as a buffer or queue for data flow between switch network 245 and IOU 250. For External Reads, the data array behaves as an 8 entry Cacheable RAM (64 bits wide). For Internal Reads or External Writes, the data array behaves as an 8 entry FIFO (64 bits wide).

Once access to bus 229 is granted to IOU 250, the requested dam is transferred to MCU 220. The requested data may be sent to switch network 245 from R/W FIFO 305 via data line 307 in non-burst mode or in burst mode which allows data to be transferred at every clock cycle.

The usage of the same data array (i.e., R/W FIFO 305) for external read, external write, and internal read operations saves the area that would have been needed for additional data queues for each unique operation. Note that an external read and write operation cannot happen at the same time. Since only one of these operations is possible at the same time, sharing hardware is more efficient than using separate queues.

Note that the D_Cache write data queue 315 has to be separate since processor 205 transfers write data to IOU 250 which can occur at the same time as data being read into processor 205. Since these two events are asynchronous, two separate queues are required.

B. When I/O Device 235 is a Master and IOU 250 is a Slave

The structure and operation of IOU 250 when one of the I/O devices 235 is the master and IOU 250 is the slave is now described. Analogous to the discussion in section III(A) above, there are generally two types of data transfers that can occur: (1) a read of main memory 260 and (2) a write to main memory 260. In addition, read and write operations to internal peripheral devices (if available) can also be supported by IOU 250.

1. Reading Data from Memory

When I/O device 235 wants to retrieve data from memory 260, I/O device 235 will initially arbitrate for I/O bus 225 IOU 250 then arbitrates for switch bus 229. Transfer of the address information can begin once access to switch bus 229 has been obtained. Tri-state buffer 353 located inside IOU PAD logic 355 allows the address to enter IOU 250. The address is subsequently placed in comparator block 335.

Comparator block 335 determines whether the addresses of the data block being requested is contiguous. In particular, the first address location is stored in comparator block 335 and this address is compared with all subsequent addresses that are stored in comparator block 335 to determine whether the two addresses are contiguous addresses. If they are not, then the most recent address stored in comparator 335 belongs to another transaction. Comparator block 335 is also responsible for determining the width size of the data. In that regard, comparator block 335 must store the lower byte in order to determine the size of the data request.

Furthermore, I/O device 235 sends multiple addresses for each read transaction. This is in contrast to MCU 220 which sends only one address and the size of the data block during a read transaction, as described above. Consequently, comparator block 335 must determine the size of the data block being requested.

Next, the address information is stored in the external address request buffer (FIFO) 320. Address request FIFO 320 stores up to four entries. Each entry includes address information, block size, and function attributes of the request from the external DMA devices or other on chip or off chip bus masters. Address request FIFO 320 holds the information until switch bus 229 becomes available. Once access to switch bus 229 is granted the information in the address request FIFO 320 is transferred to MCU 220 via switch request bus 304.

PVP 405 uses a separate PVP request buffer 420, as shown in FIG. 4. By having a request buffer, the on-chip PVP can submit requests directly into the buffer for MCU 220 without having to arbitrate for external I/O bus 225 since it is sitting on the internal I/O request bus. However, external DMA/I/O devices which need to submit requests to MCU 220 have to first arbitrate for external I/O bus 225.

Once the data is fetched from the main memory 260 it takes the same data path to I/O device 235 as described above in section III(A)(1). However, larger blocks of data are read from main memory than is required by I/O devices 235. This data is stored in a "cache-like" fashion. Thus, R/W queue 305 acts like a temporary cache for external read operations.

Address tag CAM 310 is a four entry address CAM. During external read mode, CAM 310 will be enabled to allow a 29 bit address tag to be stored. The tag is associated with a sub-block of data prefetched from port 248 and stored in queue 305. The optimum number of tags allowed in CAM 310 at any one time depends on the width and interleaving of port 248, as well as the size of queue 305. The prefetch of a block of data together with the tag for comparison purpose allows faster data access in external read mode for sequential memory accesses, which are typical. Line 312 is an address line. During DMA read requests, addresses on line 312 will be compared against tag entries from CAM 310.

IOU 250 prefetches unrequested data from main memory 260. During a read request, all data inside a sub-block of memory is transferred to IOU 250. The pre-fetched data will then be stored in R/W FIFO 305. Thus, subsequent requests for data which happen to fall into the pre-fetch sub-block can be taken out of queue 305 directly without having to go through submitting a request to MCU 220 and waiting for MCU 220 to respond. Block size is selected to match requirements of MCU port 248 for efficiency. If the second request asks for an additional two words which happen to fall into the prefetched sub-block, IOU 250 will then be able to directly fetch the data from R/W FIFO 305.

2. Writing Data to Memory

The data flow for writing data to memory 260 is similar to that described in section III(A)(2) above. Generally, data to be written to memory is passed through assembly in logic 345 (as described above) and placed in R/W FIFO 305. The memory address associated with where the dam is to be stored is transferred to external request buffer 320 via block 335. Once access is granted to bus 229, the data is transferred to switch write data bus 302, and subsequently stored in memory 260.

IV. External I/O Bus 225

External I/O bus 225 supports non-cacheable bus transfers such as single cycle or multiple cycle, burst or non-burst, 8-bit, 16-bit, or 32 bit, pseudo-locked and locked cycles. Reference is made to the Appendix attached to this disclosure for a description of the signals and pins used in IOU 250. The minimum bus cycle is two clock cycles long and its beginning is signified by the assertion of the *ADS signal. The end of a bus cycle is indicated by the assertion of the next coming of *RDY or *BRDY signals after *BLAST signal has become active low. A single bus cycle can have multiple data transfers. FIG. 6(a) through 6(h) show the timing diagrams for data transfer to and from I/O devices 235. The timing diagrams for the present invention are substantially equivalent to those used by the i486 microprocessor. Reference is thus made to the *i*486™ *Microprocessor Manual*, Chapter 6 and 7 (Order No. 24040-002), for further details of the timing diagrams. Nevertheless, the timing diagrams for the different types of data transfers are described briefly below for the convenience of the reader.

A. Single Non-Burst Cycles

Figure 6A:
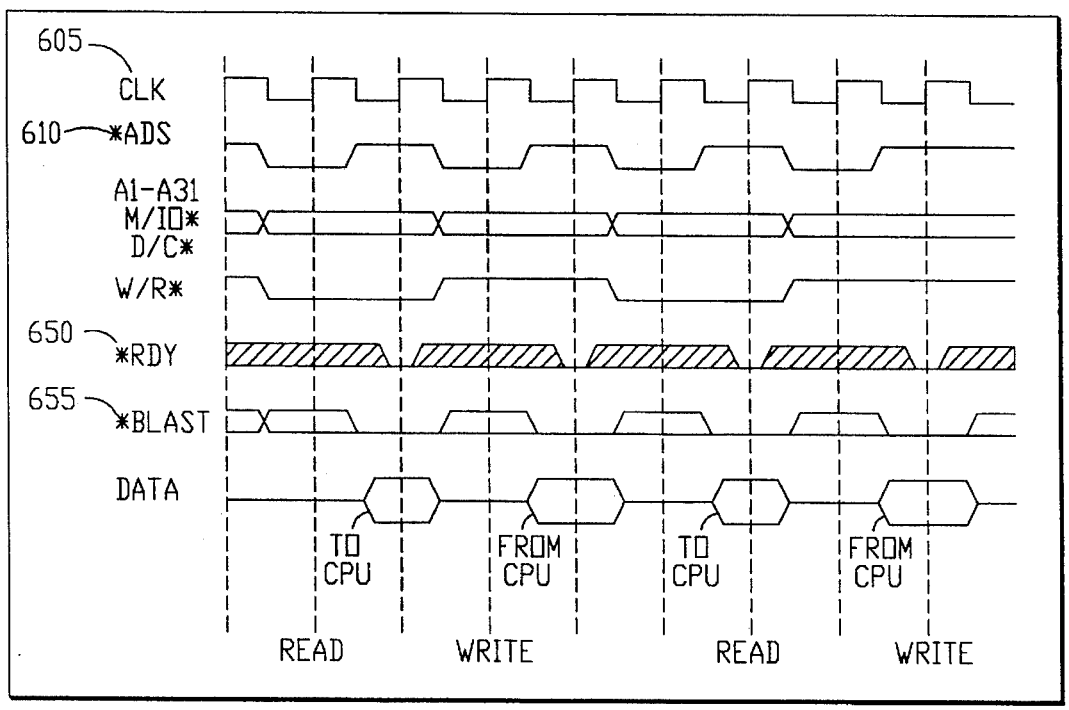
FIGS. 6(a) through 6(h) show the timing diagrams for dam transfer to and from the I/O devices 235.
Figure 6B:
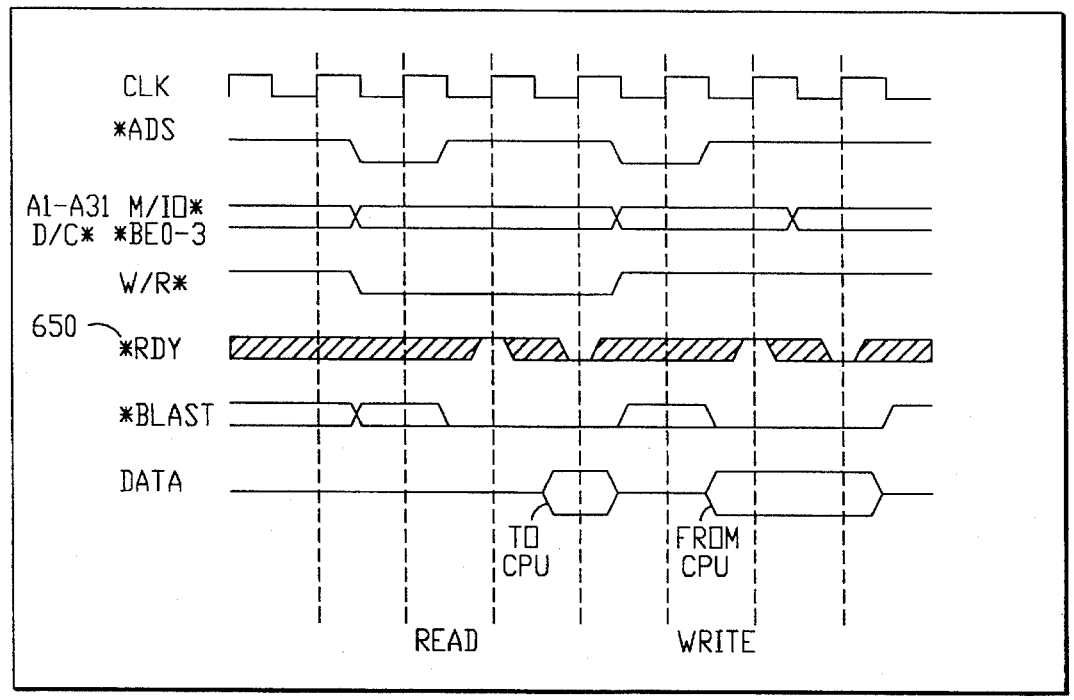

Referring to FIG. 6(a), the zero wait-state non-burst bus cycle is shown. It takes a minimum of two clock cycles to perform a read or a write in the single non-burst mode. This mode of operation is called a 2—2 bus cycle. The assertion of the *ADS (address strobe) signal 610 at the rising edge of system clock 605 indicates the beginning of a valid bus cycle which includes a valid address on the address bus and cycle definition lines. The bus cycle is terminated by signals *RDY 650 or a *BLAST 655 being asserted low at the end of the second clock cycle. One or more wait states can be inserted into a bus cycle by driving *RDY signal 650 inactive, as shown in FIG. 6(b).

B. Multiple Non-Burst Cycles

Figure 6C:
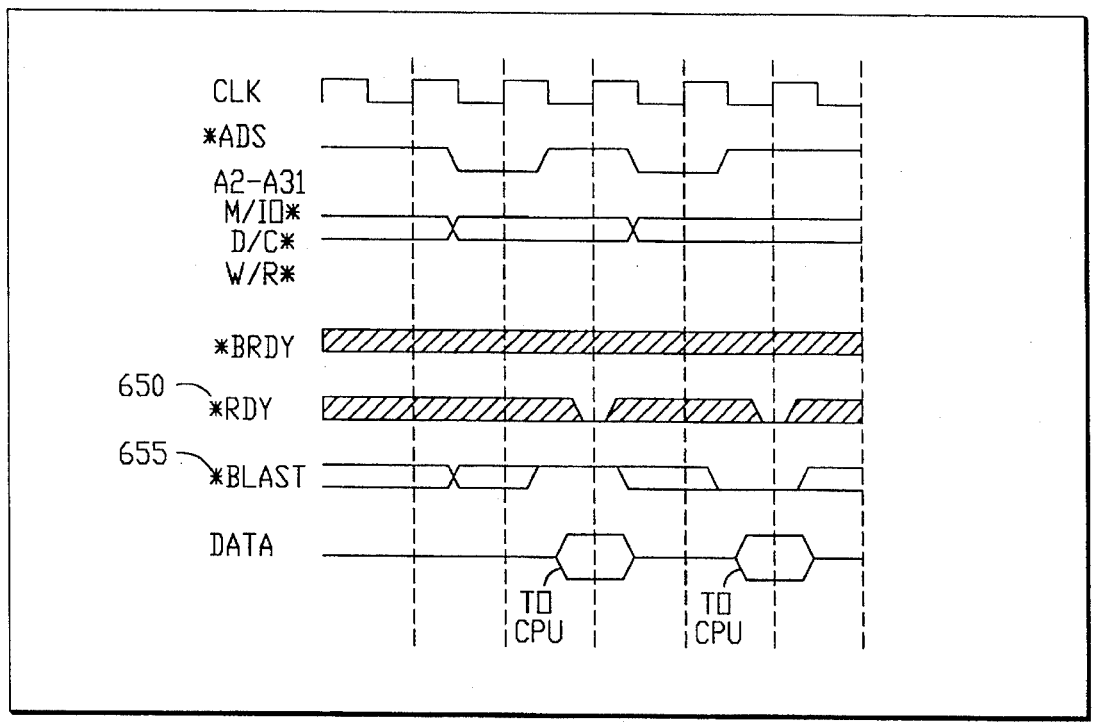

Referring to FIG. 6(c), a non-burst multiple cycle transfer can be maintained by keeping *BLAST signal 655 inactive at the end of every second clock until the second clock right before the end of the bus cycle. *RDY signal 650 is asserted at the end of every second clock to strobe data into host processor 205.

C. Burst Cycles

Figure 6D:
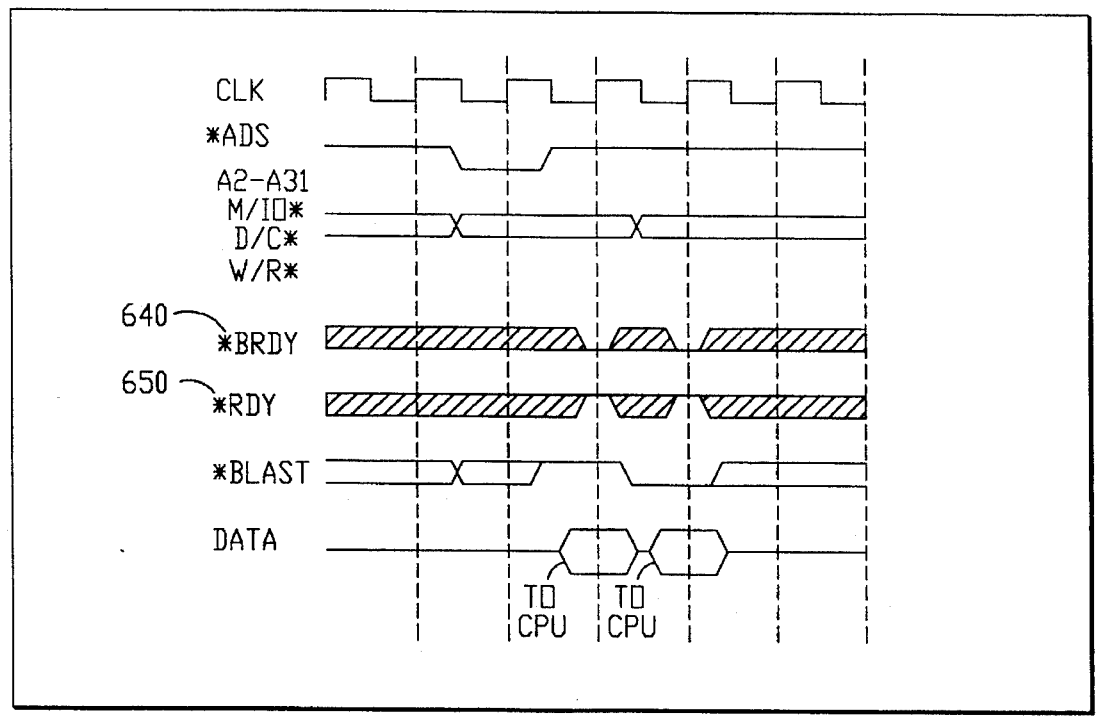

Referring to FIG. 6(d), a burst cycle can be allowed by slave by asserting *BRDY signal 640 instead of *RDY signal 650 in the first cycle of the data transfer. During burst cycles, *RDY signal 650 must be driven inactive. Wait states can be inserted into the burst cycle by driving *BRDY signal 640 inactive at the end of second clock where wait state is intended. The order of burst transfer for data is determined by the first address presented. The burst order for IOU 250 is shown in the table below.

| First Address | Second Address | Third Address | Fourth address |
|---|---|---|---|
| 0 | 4 | 8 | C |
| 8 | C | 0 | 4 |

Note that external devices may utilize different burst orders.

D. 8-bit and 16-bit Cycles

Figure 6E:
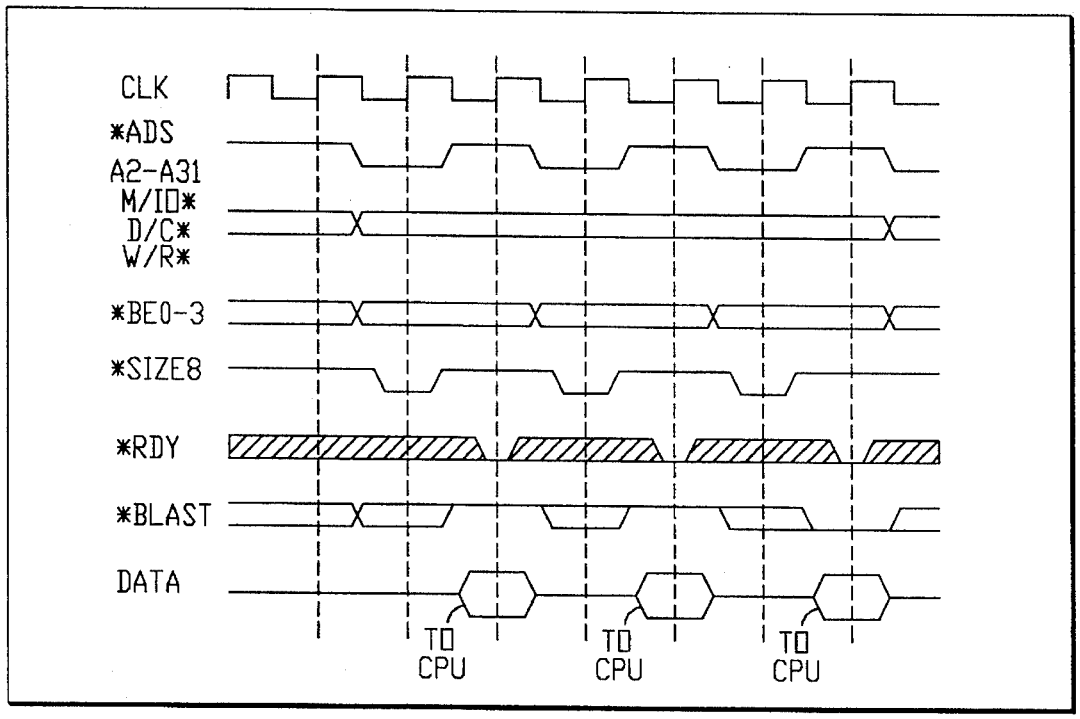
Figure 6F:
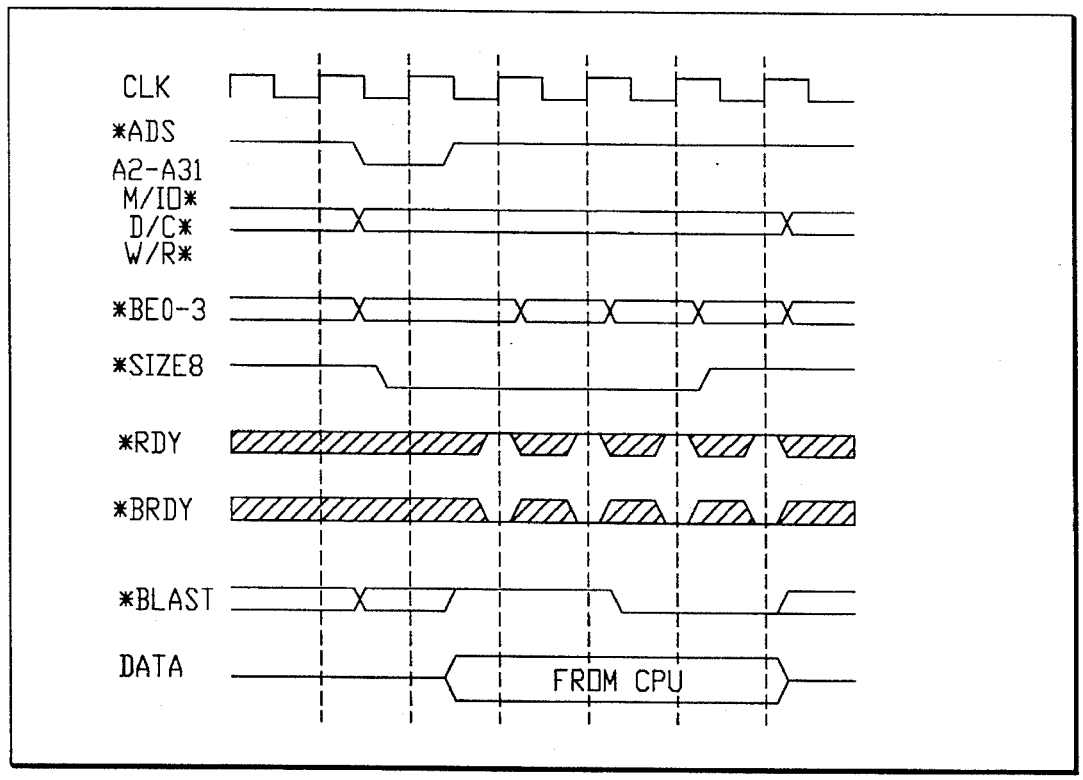

External I/O bus 225 allows connection to 8-bit or 16-bit devices by using *SIZE8 or *SIZE16 pins during non-burst or burst cycles. The bus size pins will be sampled every bus cycle. An 8-bit bus will be selected if both *SIZE8 and *SIZE16 are asserted. *SIZE8 and *SIZE16 must be asserted before the clock that *RDY or *BRDY is sampled active. Multiple bus cycles will be generated if the device being accessed has smaller bus width than the data size of the transfer operation or if alignment requires multiple cycles. Examples are illustrated in FIG. 6(e) and FIG. 6(f).

E. Pseudo-Locked Cycles

Figure 6G:
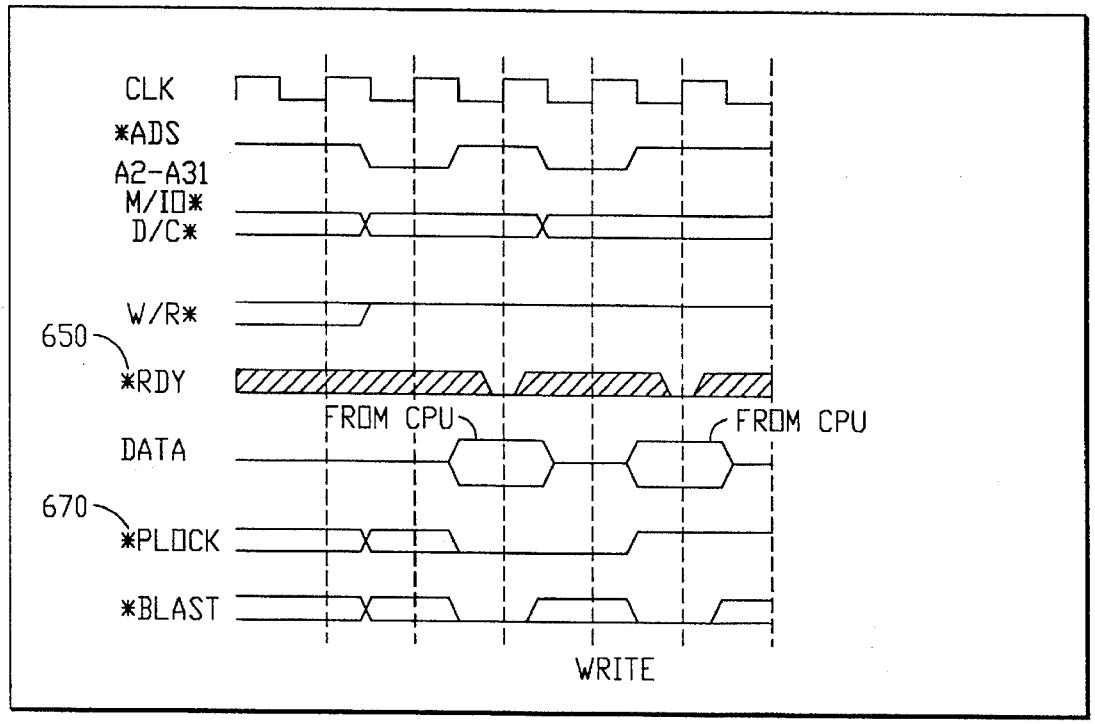

A pseudo-locked cycle indicates that current bus transaction requires more than one cycle to complete and no other bus master will be given control of the bus. Operand transfers such as 64-bit floating point read and write and cache line fills require pseudo-lock cycles. PLOCK signal 670 will be asserted until the address for the last cycle of the transaction has been driven out. PLOCK signal 670 will be sampled in the same clock as RDY signal 650 is returned. An example of a pseudo-locked cycle is illustrated in FIG. 6(g).

F. Bus Hold

Figure 6H:
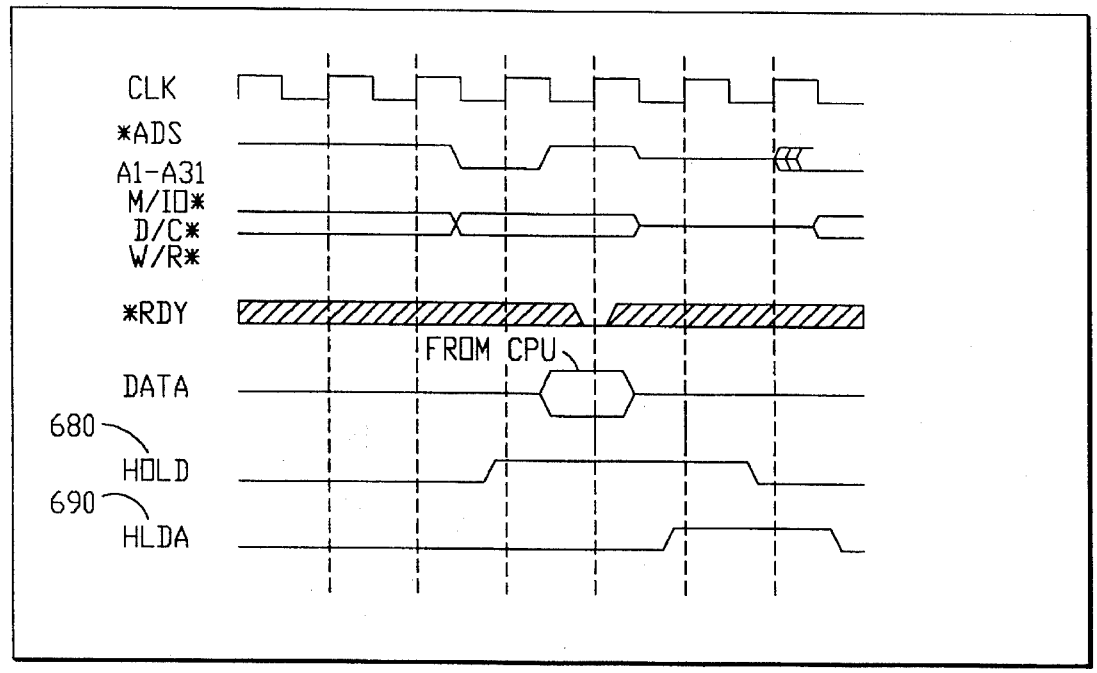

The assertion of HOLD signal 680 indicates that another bus master is arbitrating for control of external I/O bus 225. In response, after the current bus cycle is completed, the bus will be floated (D0-D31, *BE-*BE3, A2, A31, W/R*, D/C*, M/I*, *ADS and *LOCK are in high impedance state). HLDA signal 690 will be asserted in response to the HOLD signal 680 indicating that IOU 250 has given the bus to another bus master. An example of the hold operation is illustrated in FIG. 6(h).

V. External Bus Master (DMA) Operation

The external I/O bus 225 must allow DMA devices to access main memory 260. The *ICS pin is used as the "chip-select" pin to enable IOU 250 to respond to external processors or DMA devices. When accessed by an external master, the master must request external I/O bus 225. IOU 250 acts like a slave on external I/O bus 225.

Memory access from outside the I/O bus is facilitated by the availability of an external DMA controller on external I/O bus 225 or an external CPU bus to enable direct data transfer between an I/O device and the main memory without the involvement of host processor 205. In order to access main memory 260, a DMA device will arbitrate for external I/O bus 225 to become the bus master.

If the *ICS pin is asserted with the address pins, the processor will map the addresses to the main memory. A <28:0> will define the memory access addresses and A <31:29> will be ignored. If M/I/O* is low (I/O space), the access is ignored. If the *ICS pin is de-asserted, the processor will not respond.

The processor performs memory read and write cycles on addresses and data presented by external devices.

For DMA write requests, data and address information will be sent to internal queues (e.g., R/W FIFO 305 and external request buffer 320). Data is aligned as required by MCU 220 and stored in R/W FIFO 305. Once the aligned data is accepted by R/W FIFO 305, R/W FIFO 305 will respond by sending a signal back to the DMA device indicating that it is ready to accept the next available data. If R/W FIFO 305 is full, the ready signal is held deasserted. When the external device stops sending data, or when the data can no longer be accumulated by R/W FIFO 305, MCU 220 is requested to write the data to main memory 260. MCU 220 will perform the write when its arbiter grants IOU 250 access to memory port 248. The data block will then be sent to switch 245 together with the request information.

For DMA read requests, the address presented by the external DMA device is presented to MCU 220. This address is used to address an aligned block of memory (depending on the memory system interleave and bus width). When the data is returned to the appropriate I/O queue, the requested data is returned to the requesting DMA device.

In a preferred embodiment, burst mode operation is not supported during DMA read transfers (of course, as those skilled in the art can appreciate, burst mode operations could be supported during DMA transfers). Burst writes of at most one word (32 bits) starting at the word boundary will be active only if the burst enable bit in the configuration register is set. In a preferred embodiment, external interrupt vector fetches are not serviced during burst mode DMA writes for simplicity of implementation.

Figure 7A:
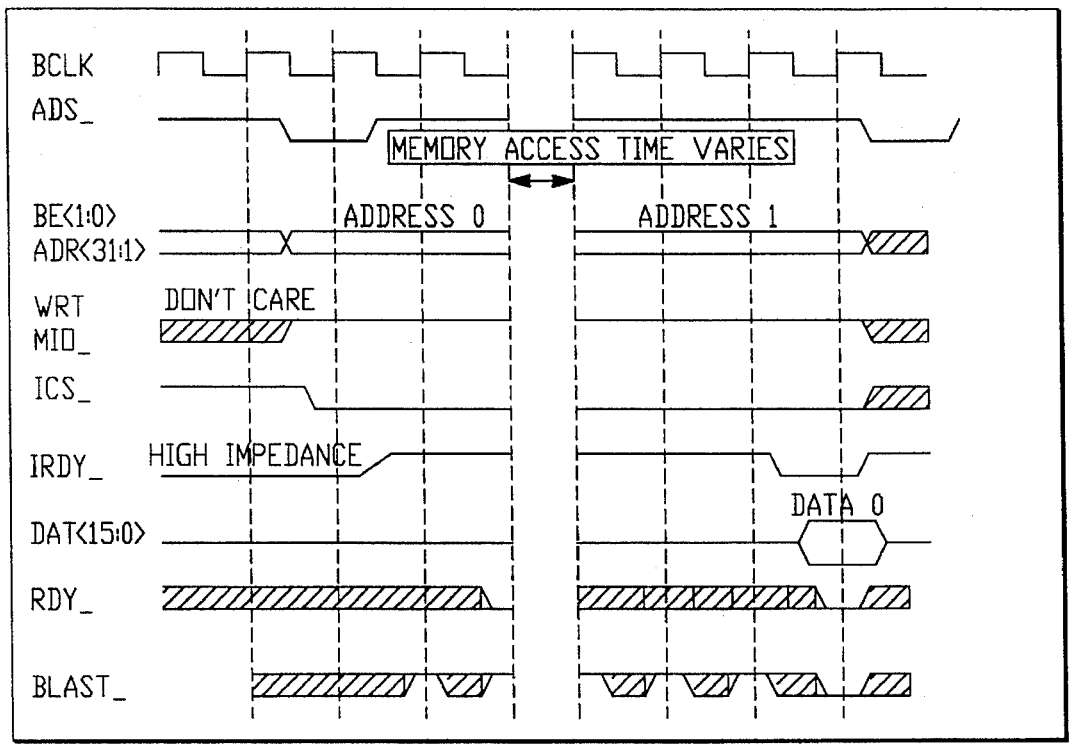
FIGS. 7(a) and 7(b) show the timing diagrams for a DMA read request.

Referring to FIG. 7(a), a DMA read cycle starts when ADS is asserted. The ICS pin and address are sampled during the rising edge of BClk. The data is requested from MCU 220. When the data returns, the requested data is driven onto the data pins and the IRDY pin is asserted. The IRDY pin is asserted to indicate that the cycle can be completed, but the cycle does not complete until the RDY pin is asserted. BLAST is used to indicate to IOU 250 that the cycle is the last in a burst. BLAST is always sampled.

R/W FIFO 305 requests more data than is requested by the first cycle, so the sequential cycles are able to run much faster than the initial cycle, in general.

Figure 7B:
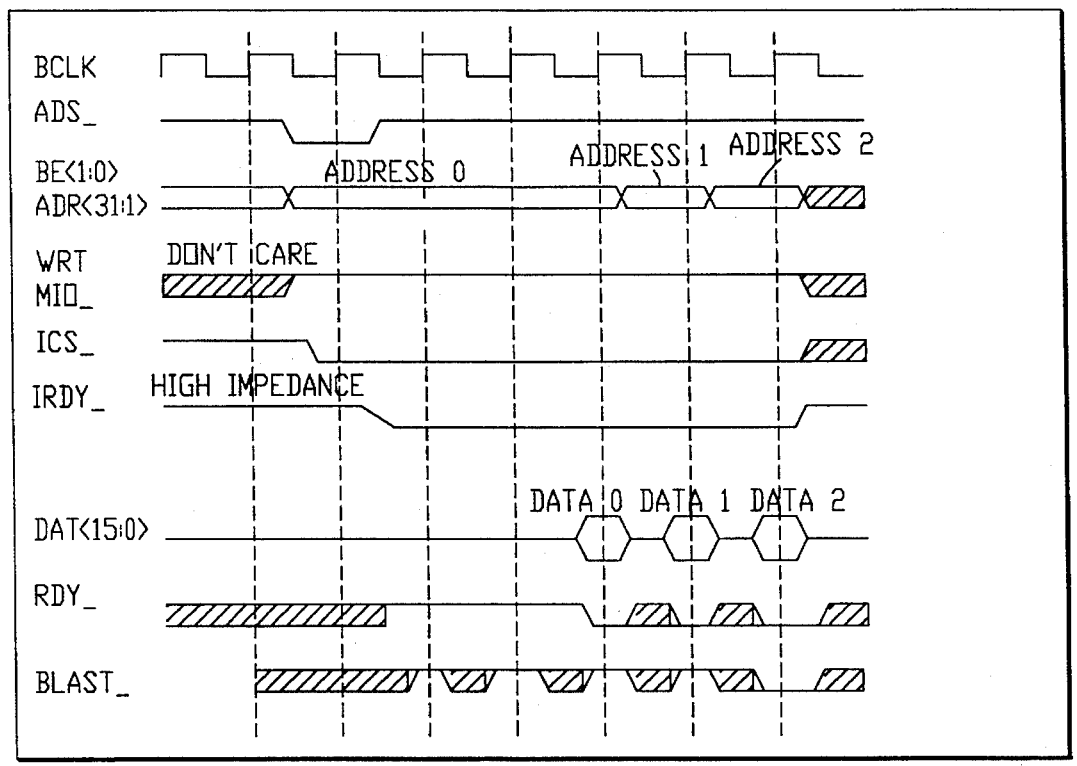

Referring to FIG. 7(b), a DMA write cycle is similar to a read cycle, except that the I/O is receiving data. It also used IRDY and BLAST in a similar manner to DMA read cycles. As long as IOU 250 can receive new data, IRDY will remain asserted. If its internal queue fills up, for example, it will de-assert IRDY. It also waits for RDY to be asserted before completing the cycle.

VI. Interrupt Control Logic And Interface

IOU 250 supports interrupts from external an internal I/O devices. External requests are requests generated by, for example, and external I/O device 235, whereas internal interrupts are those generated by on-chip I/O devices (e.g., PVP or UARTs). Internal interrupt controller 362 services interrupts on a priority order. Internal interrupt controller 362 will service interrupts from PVP, UARTs, and external I/O devices on a priority order. The interrupt in a preferred embodiment of the present invention may be one of thirty-two different levels. Pending interrupt buffer contains 5 bit interrupt priority and an active bit from each requesting device.

Internal interrupt controller 362 passes, during each clock cycle, the highest priority interrupt which has not yet been serviced to the processor. The interrupt controller 362 will compare the priority from all active levels and post the highest priority request during each clock cycle to host processor 205 and maintain all requested interrupt levels until all levels have been serviced by host processor 205. Interrupt controller 362 will reset the request (active bit) after it is granted. The processor will generate two interrupt acknowledge cycles to gate the interrupt vector data onto the lower 5 bits of the data bus. Software must reset the 8259A (external interrupt controller) interrupt level, while all other pins on the internal interrupt controller are level type.

Interrupt priorities are programmed through special registers. Other programmable features of interrupt controller 362 can be initialized or set in configuration register 370 (write only). Status information can be read from or written to status register 373 via the special registers.

For external interrupt events, a maskable interrupt from an external controller (such as 8259A), four dedicated maskable interrupts and a nonmaskable interrupt are used for posting interrupt service requests to host processor 205. For internal interrupt events, there are two maskable interrupts generated by the PVP or UARTs and a non-maskable interrupt generated if an I/O parity error is detected or if a bus timeout interrupt occurs or if a memory error is detected.

Interrupt controller 362 synchronizes asynchronous interrupt inputs, samples the synchronized interrupt pins and posts the active level to host processor 205 until the interrupt is de-asserted on the pin. Software is responsible for resetting the source of interrupt upon service by host processor 205.

If DINT (direct interrupt pin) is active, the active level indicates that the active interrupt priority is held in the associated priority register. There is one active state bit for each hardware interrupt priority level (32 bits). Once an Active State Bit is set, it must remain active until the interrupt level associated with the bit is serviced. If subsequent interrupts set an Active State Bit which is already set, they will not be recognized unless the Active State Bit is reset first. It is recommended that interrupts which can occur simultaneously be programmed to unique levels. DINT pins are serviced, even when interrupts are disabled in the IPU.

IOU 250 has an external maskable interrupt (INTR). If INTR pin is active, the process is different, since the interrupt level is held in the external controller. The interrupt controller reads the priority from the external controller (8259A type) through an interrupt acknowledge cycle (see FIG. 8) on the I/O bus. This priority is used to set an Active State Bit, as with the DINT pins, above. The interrupt handler software is responsible for ensuring that the external controller interrupt is reset, when taken.

The internal and dedicated external interrupt priorities are programmed through special registers. Other programmable features of the interrupt controller can be initialized or set in the configuration register. Status information can be read from or written to the status register via the special registers.

A. External Interrupts

INTR is level sensitive and must remain active until interrupt acknowledge cycles begin in order for the interrupt to be serviced. The INTR interrupt signal will go through two clock cycles of synchronization before reaching IOU 250. Active interrupt will begin only if the interrupt active flag in configuration register 370 is enabled. To service the pending request, two locked interrupt acknowledge cycles (as required by 8259A) will be generated to latch onto the five bit vector. The interrupt active flag will be reset when an interrupt is being serviced. Since INTR is asynchronous, it has to be resynchronized to avoid circuit problems. INTR is maskable by enabling the mask bit in status register 373. If the INTR interrupt enable bit is clear, the I/O interface will not recognize the assertion of the INTR pin. The pin must be asserted after the enable has been set for the interrupt to be recognized. External controller interrupts are not sampled if processor 205 interrupts are disabled within the IPU. However, if INTR is asserted while interrupts are disabled, the external controller is serviced by the I/O interface when processor 205 interrupts have been enabled again, as long as INTR has not been masked.

NMI is a non-maskable interrupt and will cause a vector to be generated internally. NMI is leading edge sensitive (edge triggered) and does not have to remain active until the interrupt request is being acknowledged. NMI is required to remain asserted for a minimum of three clock cycles or two clock cycles if the set-up and hold times are met. No interrupt acknowledge cycles are needed as for the NMI signal. Since NMI is asynchronous, it has to meet the set-up and hold time in order to be recognized during a specific clock edge.

The DINT pins are dedicated or direct interrupt pins. Each interrupt line can be individually masked by clearing the corresponding enable bit in the configuration register. The priority of each interrupt pin can be programmed in the interrupt priority register. If a DINT interrupt enable bit is clear, the I/O interface will not recognize the assertion of the specific DINT pin. The pin must be asserted after the enable has been set for the interrupt to be recognized.

B. Internal Interrupts

The internal devices which may produce interrupts are PVP 405 and UART 410, as shown in FIG. 4; of course these are only examples of internal peripherals. These devices provide facilities to mask their interrupts. They operate in the same way as the external interrupts. IOU 250 provides dedicated priority registers for programming their priorities. A maskable internal interrupt will also be generated if there is a memory or parity error, or if there is a bus timeout error detected.

C. Bus Timeout Interrupt

Figure 9:
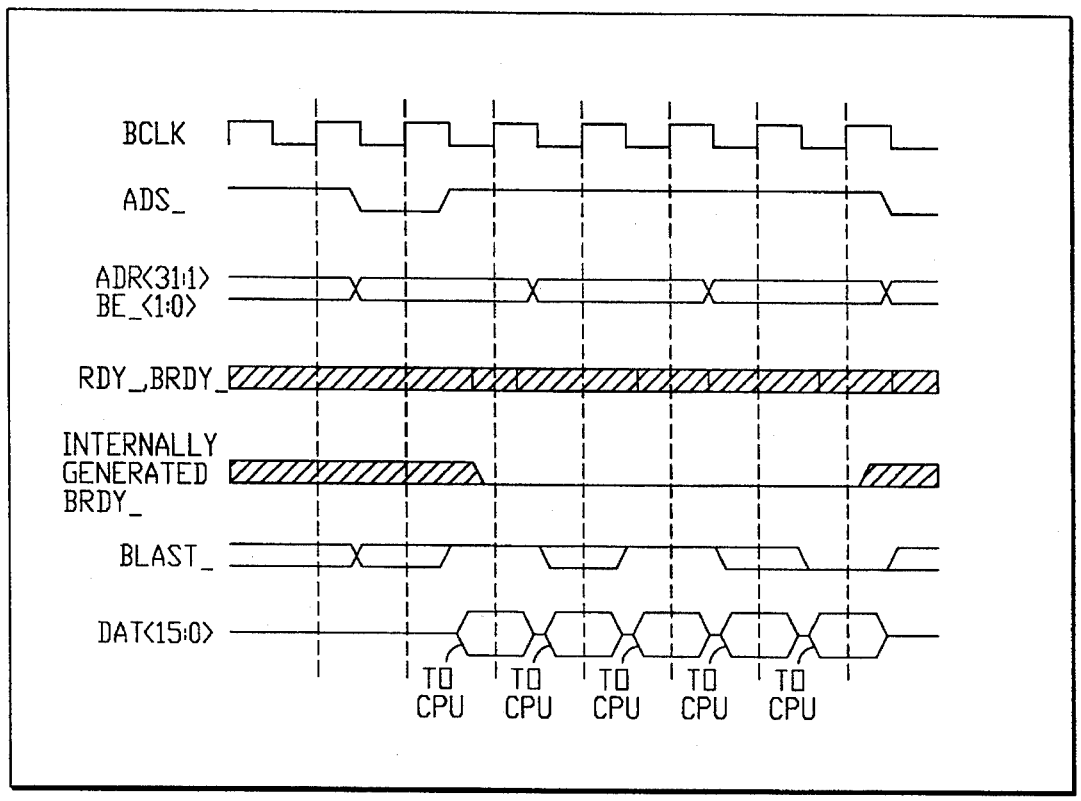
FIG. 9 shows a timing diagram for a bus timeout interrupt.

A 16-bit timer is available on chip for the detection of bus timeout errors. FIG. 9 shows a timing diagram for a bus timeout interrupt. Bus timeout occurs when there is an addressing of non-existent external I/O devices by the bus master. A mem_io_error interrupt will be generated if the bus timeout is detected and the timeout interrupt enable bit of I/O configuration register 370 is set. When a bus timeout interrupt is initiated, current unfinished bus cycles will be forced to completion without waiting for ready signals from the I/O slave. The end of the current transaction is indicated by the assertion of BLAST_. During read operations, unspecified dam will be returned by I/O slave and during write operations, write data will be passed out of the chip and be discarded. A set of optional timeout periods is provided. The timeout period can be selected by programming bits <15:14> of I/O configuration register 370.

| I/O_configuration | | |
|---|---|---|
| <15> | <14> | BClk Cycle Time |
| 0 | 0 | 65535 cycles |
| 0 | 1 | 16383 cycles |
| 1 | 0 | 4095 cycles |
| 1 | 1 | 1023 cycles |

D. Interrupt Synchronization and Sampling

All interrupt lines are passed through two clock cycles of synchronization before IOU 250 recognizes them, provided that the asserted interrupt line meets the set-up time for the first stage of synchronization. This is to ensure that the internal signals meet internal circuit requirements. The set-up and hold time specifications are given to allow more predictability in interrupt timing. The pin set-up and hold times must be met only if the interrupt is to be recognized in a given clock cycle.

E. Interrupt Acknowledge Cycle

Figure 8:
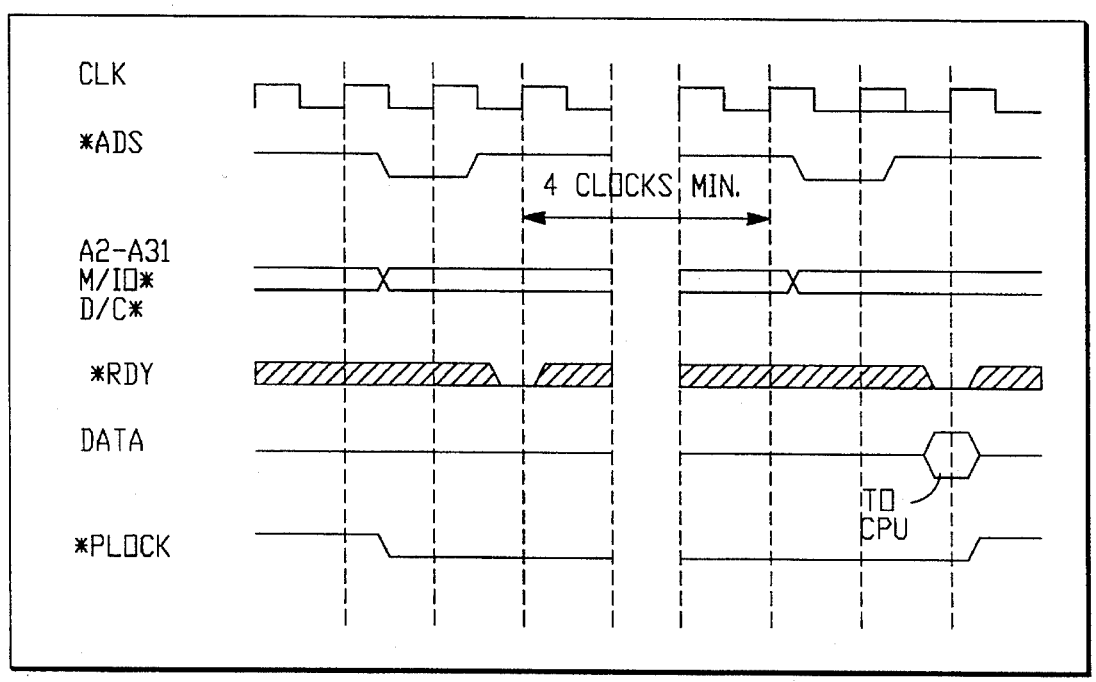
FIG. 8 shows a timing diagram for the interrupt acknowledge cycles.

Interrupt acknowledge cycles, as shown in FIG. 8, are generated by IOU 250 in response to INTR request presented at the input pin. The interrupt acknowledge cycles are generated in locked pairs. Data returned during the first cycle is ignored. An interrupt vector is returned during the second cycle on the lower bits of the data bus. Both cycles are terminated by the returned *RDY or *BRDY. Numbers of idle clocks to be inserted between the two cycles can be configured to allow 8259A some recovery time.

While the invention has been particularly shown and described with reference to preferred embodiments thereof, it will be understood by those skilled in the art that the foregoing and other changes in form and details may be made therein without departing from the spirit and scope of the invention.

Appendix

TABLE C provides a summary of the signals and pins used in IOU 250.

TABLE C

| Pins | Bits | I/O | Functions |
|---|---|---|---|
| BClk | | out | Bus Clock |
| BClkf | | in | Bus Clock Frequency/Phase |
| *ADS | | I/O | Address Strobe |
| *RDY | | in | Slave Ready |
| A | <31:1> | I/O | Address |
| *BE3–*BE0 | | I/O | Byte Enables |
| D | <15:0> | I/O | Data |
| DP | <1:0> | I/O | Data Parity |
| *PCHK | | out | Parity Error |
| M/IO* | | I/O | Memory or I/O |
| D/C* | | I/O | Data or Control |
| *WRT | | I/O | Read/*write Strobe |
| *SIZE16 | | in | 16 Bit Device |
| *SIZE8 | | in | 8 Bit Device |
| BREQ | | out | Bus Request |
| HOLD | | in | Bus Hold |
| HLDA | | out | Bus Hold Acknowledge |
| *BOFF | | in | Bus Float |
| *RDY | | in | Burst Ready |
| *BLAST | | I/O | End of Burst/Burst Request |
| RESET | | in | System Reset |
| NMI | | in | Non-Maskable External Interrupt |
| INTR | | in | Maskable External Interrupt |
| *PLOCK | | out | Pseudo Lock |
| *ICS | | in | Chip Select |
| *A20M | | in | Address Mask |
| *LOCK | | out | Bus Lock |
| *IRDY | | out | Ready Output |

BClkf is the bus clock frequency control. If the pin is high during reset, the I/O clock (BClk) is programmed to be ½ the frequency of the system clock. If the pin is low, the system clock frequency is used by the I/O controller 250. The phase of BClk relative to the system clock is known according to the reset pin timing and can be derived from BClk.

The assertion of *ADS (address strobe) indicates the beginning of an address phase of a bus cycle. It is asserted for one clock. The assertion of *RDY (ready) by the slave indicates that it is ready for the completion of a bus cycle. During write cycles, it assures I/O controller 250 that the data is latched by the slave. During read cycles, it indicates that the data is valid at the pins.

A31-A2 (address) and *BE0-3 (byte enable) defines the physical area of memory or I/O space accessed. A31-A2 are used as 4-byte word select and *BE0-*BE3 select individual bytes the 4-byte word. The byte enable pins point to the active byte during read and write cycle. *BE0 points to D0-D7. *BE1 points to D8-D15. *BE2 points to D16-D23, and *BE3 points to D24-D31. D31-D0 are the data lines for external I/O bus 225 where D31-D24 is the most significant byte and D7-D0 is the least significant byte. DP0-DP3 represent the parity of each byte of data. As discussed below, even parity is generated during write cycles. When *PCHK is active low, this indicates a parity error. Parity error is only checked for active enabled byte. It is valid only after read data is returned to I/O controller 250.

The M/IO*, D/C*, W/R* pins, as illustrated in TABLE D, define the primary bus cycles which become valid when the *ADS signal is asserted.

TABLE D

| M/IO* | D/C* | W/R* | Bus Cycle |
|---|---|---|---|
| 0 | 0 | 0 | Interrupt Acknowledge |
| 0 | 0 | 1 | Halt/Special Cycle |
| 0 | 1 | 0 | I/O Read |
| 0 | 1 | 1 | I/O Write |
| 1 | 0 | 0 | Code Read |
| 1 | 0 | 1 | Reserved |
| 1 | 1 | 0 | Memory Read |
| 1 | 1 | 1 | Memory Write |

The assertion of *SIZE 16 by the slave indicates that it is a 16 bit device. During write cycles, the slave indicates to I/O controller 250 that the data is to be selected from the active enabled bytes and routed for the slave. Valid data will be driven onto data bus pins corresponding to active byte enables. External byte swapping logic is required to route data to appropriate data lines. During read cycles, it indicates that the data is valid only on the 16 bus pins corresponding to the active byte enables (*BE0-*BE3). The pin is sampled every bus cycle.

The assertion of *SIZE8 by the slave indicates that it is an 8 bit device. During write cycles, the slave indicates to I/O controller 250 that the data is to be selected from the active enabled bytes and routed for the slave. Valid data will be driven onto data bus pins corresponding to active byte enables. External byte swapping logic is required to route data to appropriate data lines. During read cycles, it indicates that the data is valid only on the 8 bus pins corresponding to the active byte enables (*BE0-*BE3). *SIZE8 is asserted to select 8 bit cycles and overrides *SIZE16 if both are asserted.

BREQ is asserted if I/O controller 300 has a pending operation. BREQ is generated whether or not the processor is driving the bus. HOLD is the external "Bus request" input to I/O controller 300. Main memory and internal I/O devices may be accessed by external DMA devices or processors through the bus request mechanism. HOLD allows another bus master complete control of the external I/O bus 225. In response to HOLD, I/O controller 300 will float most of its output and I/O pins. HLDA will be asserted after the current bus operation cycle is completed. HOLD is maintained in its asserted state until the requesting device has completed its operations. When HLDA is asserted, the DMA master may take over the bus and reads or writes to its I/O devices or memory will be executed as if the internal processor were performing the operations.

The assertion of *BOFF will cause the processor to float its bus in the next clock. However, HLDA will not be asserted in response to *BOFF. *BOFF has higher priority than *RDY or *BRDY. Processor bus will remain floated until *BOFF is negated. Bus cycle in progress interrupted by *BOFF will restart after *BOFF is de-asserted.

In the second or subsequent clocks of a burst cycle, *BRDY will be sampled. *BRDY indicates that during burst write cycles, it assures I/O controller 300 that the data is latched by the slave or during burst read cycles, it indicates that the data is valid at the pins. If both *RDY and *BRDY are asserted simultaneously, *BRDY is ignored and the burst cycle is prematurely aborted.

BLAST is used to indicate the end of a burst or non-burst bus Read/Write cycles when the next *BRDY or *RDY is sampled active after the *BLAST has been asserted.

The assertion of RESET pin will force the processor to being execution at a preset state until VCC and SCLK have reached their proper DC and AC specifications.

NMI is a non-maskable interrupt indicating an external device has generated an interrupt request to the processor. NMI six rising edge sensitive and must be maintained low for a minimum of four clock periods before the rising edge. An external device requests a maskable interrupt of the internal processor by asserting the INTR pin. The processor will generate two locked interrupt acknowledge bus cycles in response to the assertion of IRQ pins. Interrupt request will be maintained until the processor has granted the request.

*PLOCK indicates that the current bus transaction requires more than one bus cycle to complete. If the *ICS pin is asserted with the address pins, the processor will map the addresses to the main memory. If the *ICS is deasserted, the processor will not respond.

*A20M emulates the address wraparound at one Mbyte which occurs on the 8086. When *A20M is asserted, A20 will be masked by the processor before driving a memory cycle on the bus.

The signals and pin descriptions above are utilized by IOU State Machine and Control Logic block 380 to generate the necessary timing signals to transfer data and/or instructions to/from IOU 250. The timing signals used for transferring the data and/or instructions are equivalent to those used by the i486 microprocessor (see the *i486™ Microprocessor Manual* (Order No. 240440-002).

What is claimed is:

1. An input/output (I/O) control unit for interfacing at least one peripheral device, the I/O control unit is connected to a memory control unit, wherein the memory control unit is also connected to a host processor and a memory unit, the I/O control unit comprising:

(a) a write data queue, coupled to the memory control unit via a first bus, configured to store data intended to be written to at least one peripheral device;

(b) a request queue, coupled to the memory control unit via said first bus, configured to store write request information from the host processor;

(c) align-out logic configured to align data to be transferred to said at least one peripheral device via a second bus, said align out logic connected to receive data from said write data queue;

(d) assembly-in logic configured to assemble and align incoming data from said at least one peripheral device;

(e) an address sequence generator, coupled to said request queue, configured to receive said write request information from said request queue while said align-out logic receives said data from said write data queue, and further configured to generate a continuous sequence of addresses while said align-out logic aligns said data, said ..continuous sequence of addresses to be applied to said at least one peripheral device via said second bus;

(f) comparator means, coupled to said assembly-in logic, configured to check whether a data block transferred from said at least one peripheral has an address which falls within a requested address range, and further configured to determine whether a first address associated with an external read from said at least one peripheral is contiguous with a second address associated with said external read;

(g) a read/write data queue, coupled to said align-in logic, said align-out logic and said first bus, configured to temporarily store read or write data being transferred from said at least one peripheral device to said first bus or read data being transferred from said memory control unit to said peripheral device;

(h) a request buffer, coupled to said comparator means, for buffering read request information from said at least one peripheral device; and (i) an address tag buffer, coupled to said comparator means, configured to store an address tag associated with said data temporarily stored in said read/write data queue, said address tag buffer configured to compare an address associated with an external read request with said address tag associated with said data temporarily stored in said read/write data queue to determine if data associated with said external read request is already temporarily stored in said read/write data queue such that said requested data may be read from said read/write data queue without requiring an external read.

2. The I/O control unit of claim 1, wherein said first bus and said second bus are separate and distinct from a third bus connecting the memory unit to the memory control unit.

3. The I/O control unit of claim 1, wherein the I/O control unit is on the same chip as the host processor.

4. The I/O control unit of claim 1, wherein the I/O control unit is connected to the at least one peripheral device, wherein said at least one peripheral device can handle 8, 16, and/or 32 bit data transfers.

5. The I/O control unit of claim 1, further comprising an internal arbiter for arbitrating requests for access to said second bus from an external interrupt controller, a peripheral internal to the I/O control unit, an external bus master, or the host processor, wherein data transfer from the I/O control unit to the at least one peripheral device may begin once access to said second bus is granted.

6. The I/O control unit of claim 1, wherein said write data queue is an eight entry, 64 bit wide first-in-first-out buffer.

7. The I/O control unit of claim 1, wherein said read/write data queue operates as a cache during an external read operation initiated by said at least one peripheral, wherein said external read operation requests larger blocks of data than required by said at least one peripheral.

8. The I/O control unit of claim 1, further comprising a parity generator/checker, coupled to said align out logic and said assembly in logic, configured to generate and/or check parity of outgoing data and incoming data, respectively.

9. The I/O control unit of claim 1, further comprising an interrupt controller to manage internal and external interrupts, wherein said interrupt controller provides a signal to the host processor.

10. The I/O control unit of claim 1, further comprising an on-chip printer video processor (PVP), coupled to said first bus and said second bus, that operates substantially similarly to said at least one peripheral device.

11. The printer video processor (PVP) of claim 10, further comprising an on-chip request buffer, coupled to said PVP, configured to store write or read request information, whereby said PVP does not have to arbitrate for said second bus before making write or read requests.

12. The I/O control unit of claim 1, wherein the I/O control unit is connected to other host processors in a multiprocessor environment.

13. The I/O control unit of claim 1, wherein data can be transferred onto said second bus in at least one of a single cycle, multiple cycles, burst cycles, non-burst cycles, pseudolocked cycles and locked cycles.

14. The I/O control unit of claim 1, further comprising a universal asynchronous receiver/transmitter connected to said second bus.

15. The I/O control unit of claim 1, further comprising control logic for generating control timing for the transfer of data to said second bus.

16. The I/O control unit of claim 1, wherein said second bus is a synchronous, 32 bit wide, bidirectional bus having parallel lines for data and addresses.

17. The I/O control unit of claim 1, wherein said comparator means further determines the size of said data block being requested.

18. The I/O control unit of claim 1, wherein the I/O control unit prefetches unrequested data from the memory unit during data read of the memory unit by said at least one peripheral device.

19. The I/O control unit of claim 1, wherein said at least one peripheral device is a direct memory access (DMA) controller.

20. An input output control unit that connects a host processor to an external input/output bus that is connected to at least one external master device, the input output control unit and the host processor are also connected to a memory device via a memory control unit, the input output control unit comprising:

a first dedicated path for the transfer of data read from the at least one external master device or data written from the at least one external master device to the memory control unit, or for the transfer of data returned from a read of the memory device from the memory control unit to the at least one external master device;

a second dedicated path for transfer of data written by the host processor from the memory unit to the at least one external master device;

a third dedicated path, connected between the memory control unit and the at least one external master device for transfer of memory addresses for identification of addressed memory segments; and interface logic, to permit data of differing widths to be transferred between the memory control unit and the at least one external master device;

wherein the input output control unit is configured to provide status information to the host processor, and the input output control unit and the host processor are located on a single chip.

21. The input output control unit of claim 20, wherein the input output control unit is connected to and supports an external interrupt controller, wherein said external interrupt controller is located peripheral to the input output control unit.

22. A microprocessor system comprising:

a memory control unit;

a memory unit connected to said memory control unit via a first bus;

a host processor connected to said memory control unit via a cache control unit, wherein said host processor is configured to execute software instructions stored at memory locations within said memory unit and said cache control unit operates as a buffer for storing said software instructions;

an input output control unit connected to said memory control unit via a second bus and connected to at least one peripheral device via a third bus, wherein said input output control unit is configured to provide status information for said host processor, said input output control unit comprising, a first dedicated path for the transfer of data read from the at least one peripheral device or data written from said at least one peripheral device to said memory control unit, or for the transfer of data returned from a read of the memory unit from said memory control unit to said at least one peripheral device when said at least one peripheral device is operating as a master device;

a second dedicated path for transfer of data written by the host processor from said memory control unit to said at least one peripheral device; and a third dedicated path, connected between said second bus and said third bus, for transfer of memory addresses for identification of addressed memory segments.

23. The system of claim 22, wherein said third bus is a synchronous, 32 bit wide, bidirectional bus having parallel lines for data and addresses.

24. The system of claim 22, further comprising an internal arbiter configured to arbitrate for access to said third bus.

25. The system of claim 22, further comprising alignment means, connected to said third bus, said first dedicated path, and said second dedicated path, for aligning incoming or outgoing data to or from said input output control unit, respectively.

26. The system of claim 25, further comprising means, connected to said alignment means, for at least one of generating and checking parity of outgoing or incoming data, respectively.

27. The system of claim 22, further comprising an on-chip video processor and a universal asynchronous receiver/transmitter both connected to said third bus.

28. The system of claim 22, further comprising control logic for generating control timing for the transfer of said data to said third bus.

29. The system of claim 22, wherein data can be transferred onto said third bus in at least one of a single cycle, multiple cycles, burst cycles, non-burst cycles, pseudolocked cycles and locked cycles.

30. The system of claim 22, wherein said input output control unit is connected to other host processors in a multiprocessor environment.

31. The system of claim 22, wherein said input output control unit prefetches unrequested data from said memory unit during data read of said memory unit by said at least one peripheral device.

32. The system of claim 22, wherein said at least one peripheral device is a direct memory access (DMA) controller.

33. A microprocessor system comprising:

a memory control unit;

a memory unit connected to said memory control unit via a first bus;

a host processor connected to said memory control unit via a cache control unit, wherein said host processor is configured to execute software instructions stored at memory locations within said memory unit and said cache control unit operates as a buffer for storing said software instructions;

an input output control unit connected to said memory control unit via a second bus and connected to at least one peripheral device via a third bus, wherein said input output control unit is configured to provide status information for said host processor, said input output control unit comprising, a first dedicated path for the transfer of data read from the at least one peripheral device or data written from said at least one peripheral device to said memory control unit, or for the transfer of data returned from a read of the memory unit from said memory control unit to said at least one peripheral device when said at least one peripheral device is operating as a master device:

a second dedicated path for transfer of data written by the host processor from said memory control unit to said at least one peripheral device, wherein said second dedicated path comprises a write data queue that is a first-in-first-out buffer; and a third dedicated path, connected between said second bus and said third bus, for transfer of memory addresses for identification of addressed memory segments.

34. The system of claim 33, wherein said first dedicated path comprises a read/write data array, coupled to said second bus to temporarily store data being transferred between said memory control unit and said at least one peripheral device in response to an external read operation, wherein said external read operation requests larger blocks of data than required by said at least one peripheral device.

35. A microprocessor system comprising:

a memory control unit;

a memory unit connected to said memory control unit via a first bus;

a host processor connected to said memory control unit via a cache control unit, wherein said host processor is configured to execute software instructions stored at memory locations within said memory unit and said cache control unit operates as a buffer for storing said software instructions;

an input output control unit connected to said memory control unit via a second bus and connected to at least one peripheral device via a third bus, wherein said input output control unit is configured to provide status information for said host processor, said input output control unit comprising, a first dedicated path for the transfer of data read from the at least one peripheral device or data written from said at least one peripheral device to said memory control unit, or for the transfer of data returned from a read of the memory unit from said memory control unit to said at least one peripheral device when said at least one peripheral device is operating as a master device;

a second dedicated path for transfer of data written by the host processor from said memory control unit to said at least one peripheral device; and a third dedicated path, connected between said second bus and said third bus, for transfer of memory addresses for identification of addressed memory segments, wherein said third dedicated path comprises:

(a) a request queue, coupled to said memory control unit via said second bus, to store read or write request information from said host processor;

(b) an address sequence generator, coupled to said request queue, to generate a continuous sequence of addresses from said read or write request information;

(c) a request buffer, coupled to said memory control unit via said second bus, to buffer read request information from said at least one peripheral device; and (d) a comparator, coupled to said request buffer, configured to check whether a data block transferred from said at least one peripheral device has an address that falls within an address range associated with a requested data block, and further configured to determine whether a first address associated with an external read from said at least one peripheral is contiguous with a second address associated with said external read.

36. The system of claim 35, wherein said comparator further determines the size of said data block being requested.

37. The system of claim 35, wherein said second dedicated path comprises a write data queue that is a first-in-first-out buffer.

38. The system of claim 35, wherein said first dedicated path comprises a read/write data array, coupled to said second said memory control unit and said at least one peripheral device in response to an external read operation, wherein said external read operation requests larger blocks of data than required by said at least one peripheral device.

39. A microprocessor system comprising:

a memory control unit;

a memory unit connected to said memory control unit via a first bus;

a host processor connected to said memory control unit via a cache control unit, wherein said host processor is configured to execute software instructions stored at memory locations within said memory unit and said cache control unit operates as a buffer for storing said software instructions;

an input output control unit connected to said memory control unit via a second bus and connected to at least one peripheral device via a third bus, wherein said input output control unit is configured to provide status information for said host processor, said input output control unit comprising, a first dedicated path for the transfer of data read from the at least one peripheral device or data written from said at least one peripheral device to said memory control unit, or for the transfer of data returned from a read of the memory unit from said memory control unit to said at least one peripheral device when said at least one peripheral device is operating as a master device, wherein said first dedicated path comprises a read/write data array, coupled to said second bus, to temporarily store data being transferred between said memory control unit and said at least one peripheral device in response to an external read operation, wherein said external read operation requests larger blocks of data than required by said at least one peripheral device;

a second dedicated path for transfer of data written by the host processor from said memory control unit to said at least one peripheral device; and a third dedicated path, connected between said second bus and said third bus, for transfer of memory addresses for identification of addressed memory segments.

40. The system of claim 39, further comprising an address tag buffer, coupled to an external request buffer of said first dedicated path, for storing address tags, said address tag buffer configured to compare an address from said external read operation with said stored address tags in order to determine whether data associated with said external read operation has been prefetched and stored in said read/write data array.

41. A microprocessor system comprising:

a memory control unit;

a memory unit connected to said memory control unit via a first bus;

a host processor connected to said memory control unit via a cache control unit, wherein said host processor is configured to execute software instructions stored at memory locations within said memory unit and said cache control unit operates as a buffer for storing said software instructions;

an input output control unit connected to said memory control unit via a second bus and connected to at least one peripheral device via a third bus, wherein said input output control unit is configured to provide status information for said host processor, said input output control unit comprising, a first dedicated path for the transfer of data read from the at least one peripheral device or data written from said at least one peripheral device to said memory control unit, or for the transfer of data returned from a read of the memory unit from said memory control unit to said at least one peripheral device when said at least one peripheral device is operating as a master device;

a second dedicated path for transfer of data written by the host processor from said memory control unit to said at least one peripheral device;

a third dedicated path, connected between said second bus and said third bus, for transfer of memory addresses for identification of addressed memory segments;

an on-chip video processor and a universal asynchronous receiver/transmitter both connected to said third bus; and an on-chip request buffer, coupled to said video processor, configured to store write or read request information, whereby said video processor does not have to arbitrate for said third bus before making write or read requests.

42. A microprocessor system comprising:

a memory control unit;

a memory unit connected to said memory control unit via a first bus;

a host processor connected to said memory control unit via a cache control unit, wherein said host processor is configured to execute software instructions stored at memory locations within said memory unit and said cache control unit operates as a buffer for storing said software instructions;

an input output control unit connected to said memory control unit via a second bus and connected to at least one peripheral device via a third bus, wherein said input output control unit is configured to provide status information for said host processor, said input output control unit comprising, a first dedicated path for the transfer of data read from the at least one peripheral device or data written from said at least one peripheral device to said memory control unit, or for the transfer of data returned from a read of the memory unit from said memory control unit to said at least one peripheral device when said at least one peripheral device is operating as a master device wherein said first dedicated path comprises a read/write (R/W) data array, wherein said R/W data array operates as a cacheable RAM during external reads from said at least one peripheral device, and as a first-in-first-out buffer during reads internal to said input output control unit and during external writes to said host processor;

a second dedicated path for transfer of data written by the host processor from said memory control unit to said at least one peripheral device; and a third dedicated path, connected between said second bus and said third bus, for transfer of memory addresses for identification of addressed memory segments.

* * * * *